US011303465B2

(12) United States Patent
Trim et al.

(10) Patent No.: US 11,303,465 B2
(45) Date of Patent: Apr. 12, 2022

(54) CONTEXTUALLY AWARE CONFERENCING SYSTEM

(71) Applicant: International Business Machines Corporation, Armonk, NY (US)

(72) Inventors: Craig M. Trim, Ventura, CA (US); Adam Lee Griffin, Dubuque, IA (US); Shikhar Kwatra, Raleigh, NC (US); Hyman David Chantz, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/930,379

(22) Filed: Jul. 16, 2020

(65) Prior Publication Data
US 2022/0021551 A1    Jan. 20, 2022

(51) Int. Cl.
*G06F 15/16* (2006.01)
*H04L 12/18* (2006.01)

(52) U.S. Cl.
CPC ...... *H04L 12/1831* (2013.01); *H04L 12/1818* (2013.01); *H04L 12/1822* (2013.01)

(58) Field of Classification Search
None
See application file for complete search history.

(56) References Cited

U.S. PATENT DOCUMENTS

| | | | |
|---|---|---|---|
| 6,891,566 B2 | 5/2005 | Marchese | |
| 7,428,000 B2 | 9/2008 | Cutler | |
| 9,253,443 B1 | 2/2016 | Chougle | |
| 9,888,280 B2 | 2/2018 | Dutta | |
| 10,044,973 B2 | 8/2018 | Duggal | |
| 10,194,203 B2 | 1/2019 | Avila | |
| 10,535,371 B2 | 1/2020 | Cilingir | |
| 10,592,733 B1 | 3/2020 | Ramanarayanan | |
| 10,601,884 B2 | 3/2020 | Amsterdam | |
| 10,645,341 B1 | 5/2020 | Noland | |
| 10,863,227 B2 | 12/2020 | Faulkner | |
| 2006/0010206 A1* | 1/2006 | Apacible | G06F 15/163 709/205 |

(Continued)

FOREIGN PATENT DOCUMENTS

CN    101448145 A    6/2009

OTHER PUBLICATIONS

List of IBM Patents or Patent Applications Treated as Related, Filed Jul. 21, 2020, 2 pages.

(Continued)

*Primary Examiner* — Phyllis A Book
(74) *Attorney, Agent, or Firm* — Haley J. McClory

(57) ABSTRACT

A computer-implemented method for switching the meeting mode of a communication feed during a conference call is disclosed. The computer-implemented method can receive a first feed type from the communication feed during a first meeting mode. The computer-implemented method can detect a plurality of contextual activity from the communication feed of a first party. The computer-implemented method can observe a first mode switch indicator from the plurality of contextual activity. The computer-implemented method can, responsive to observing the first mode switch indicator, switch the conference call from the first meeting mode to a second meeting mode of the communication feed.

18 Claims, 12 Drawing Sheets

(56) References Cited

U.S. PATENT DOCUMENTS

| | | | |
|---|---|---|---|
| 2008/0200154 A1 | 8/2008 | Maharajh | |
| 2010/0251177 A1* | 9/2010 | Geppert | H04M 1/247 |
| | | | 709/206 |
| 2012/0262533 A1* | 10/2012 | Gannu | H04M 3/567 |
| | | | 704/E15.005 |
| 2013/0258036 A1 | 10/2013 | Tong | |
| 2013/0283401 A1 | 10/2013 | Pabla | |
| 2014/0152760 A1 | 6/2014 | Granström | |
| 2014/0222907 A1* | 8/2014 | Seligmann | H04L 65/103 |
| | | | 709/204 |
| 2015/0070516 A1 | 3/2015 | Shoemake | |
| 2016/0188997 A1 | 6/2016 | Desnoyer | |
| 2016/0379597 A1* | 12/2016 | Miki | H04L 65/403 |
| | | | 345/2.2 |
| 2016/0381419 A1 | 12/2016 | Zhang | |
| 2017/0331904 A1* | 11/2017 | Padhye | H04W 4/50 |
| 2018/0213013 A1* | 7/2018 | Adams | H04L 65/1083 |
| 2018/0262804 A1 | 9/2018 | Singh | |
| 2019/0158924 A1 | 5/2019 | Foerster | |
| 2019/0286756 A1 | 9/2019 | Sweeney | |
| 2019/0327183 A1 | 10/2019 | Ward | |
| 2019/0370283 A1 | 12/2019 | Church | |
| 2020/0013076 A1 | 1/2020 | Rinzler | |
| 2020/0145617 A1* | 5/2020 | Zavesky | H04N 7/157 |
| 2020/0358983 A1 | 11/2020 | Astarabadi | |
| 2020/0412772 A1 | 12/2020 | Nesta | |

OTHER PUBLICATIONS

Trim et al., "Video Modifying Conferencing System", U.S. Appl. No. 16/930,457, filed Jul. 16, 2020.

Trim et al., "Audio Modifying Conferencing System", U.S. Appl. No. 16/930,401, filed Jul. 16, 2020.

"Cognitive Communication", Alcatel-Lucent Enterprise, downloaded from the Internet on Apr. 28, 2020, <https://www.al-enterprise.com/en/trends/cognitive-communication>, 7 pages.

"IBM Connections Meetings Cloud—Overview—United States", IBM, Internet Archive Wayback Machine, Jun. 19, 2019, 6 pages, <https://web.archive.org/web/20190619235714/https://www.ibm.com/us-en/marketplace/online-meetings>.

"Smart Video Calling with Alexa Built-in", Portal from Facebook, retrieved from the Internet on Apr. 23, 2020, 2 pages, <https://portal.facebook.com/>.

The Future of Video with Watson, IBM, Watson Media, retrieved from the Internet on Apr. 23, 2020, 5 pages, <https://video.ibm.com/>.

Mell et al., "The NIST Definition of Cloud Computing", Recommendations of the National Institute of Standards and Technology, NIST Special Publication 800-145, Sep. 2011, 7 pages.

Pongnumkul et al., "Pause-And-Play: Automatically Linking Screencast Video Tutorials With Applications", UIST'11, Oct. 16-19, 2011, Santa Barbara, Ca, USA, 10 pages, Copyright 2011 ACM.

Roth et al., "AVA-ActiveSpeaker: An Audio-Visual Dataset for Active Speaker Detection", arXiv:1901.01342v2 [cs.CV] May 25, 2019, 15 pages.

Schedl et al., "User-Aware Music Retrieval", Multimodal Music Processing, Dagstuhl Follow-Ups, vol. 3, pp. 135-156, 2012, Digital Object Identifier 10.4230/DFU.Vol3.11041.135.

Tsiaras et al., "Video and Audio Based Detection of Filled Hesitation Pauses in Classroom Lectures", 17th European Signal Processing Conference (EUSIPCO 2009), Glasgow, Scotland, Aug. 24-28, 2009, pp. 834-838, © EURASIP, 2009.

\* cited by examiner

CONTEXTUALLY AWARE CONFERENCING SYSTEM

BACKGROUND

Aspects of the present invention relate generally to modifying communication device feeds, and more particularly to modifying communication devices feeds associated with a conference call.

Communication devices have changed significantly over time, particularly in the last decade. In today's world, most people have personal computers, carry cellphones, and have smart watches capable of acting as communication devices. These changes have not only altered people's personal lives, allowing people to easily stay in contact despite geographical distances, but has also altered their work lives as well. Because of these communication devices, many employers are choosing to let their employees work from home or have remote offices. Many people, whether for personal or work-related needs, have developed a dependency on this technology to fulfill everyday tasks. While current conferencing systems generally allow for a person to share audio, video, or both with another person via a communication device, such systems are generally one dimensional, often limiting a user participating in a conference call the simple choice of either turning a communication feed on or off during the conference call. These limitations can result in leaving a device on during inactive times, time delays associated with missed calls, and a reduction of productivity.

SUMMARY

According to one embodiment of the present invention, for switching the meeting mode of a communication feed during a conference call. The computer-implemented method includes receiving a first feed type from the communication feed during a first meeting mode. The computer-implemented method further includes detecting a plurality of contextual activity from the communication feed of a first party. The computer-implemented method further includes observing a first mode switch indicator from the plurality of contextual activity. The computer-implemented method further includes responsive to observing the first mode switch indicator, switching the conference call from the first meeting mode to a second meeting mode of the communication feed.

According to another embodiment of the present invention, a computer program product for switching the meeting mode of a communication feed during a conference call. The program instructions include instructions receive a first feed type from the communication feed during a first meeting mode. The program instructions further include instructions to receive a first feed type from the communication feed during a first meeting mode. The program instructions further include instructions to detect a plurality of contextual activity from the communication feed of a first party. The program instructions further include instructions to observe a first mode switch indicator from the plurality of contextual activity. The program instructions further include instructions to switch the conference call from the first meeting mode to a second meeting mode of the communication feed, responsive to observing the first mode switch indicator.

According to another embodiment of the present invention, a computer system for switching the meeting mode of a communication feed during a conference call. The computer system includes one or more computer processors, one or more computer readable storage media, and program instructions stored on the computer readable storage media for execution by at least one of the one or more processors. The program instructions include instructions to receive a first feed type from the communication feed during a first meeting mode. The program instructions further include instructions to detect a plurality of contextual activity from the communication feed of a first party. The program instructions further include instructions to observe a first mode switch indicator from the plurality of contextual activity. The program instructions further include instructions to switch the conference call from the first meeting mode to a second meeting mode of the communication feed, responsive to observing the first mode switch indicator.

BRIEF DESCRIPTION OF THE DRAWINGS

The drawings included in the present invention are incorporated into, and form part of, the specification. They illustrate embodiments of the present invention and, along with the description, serve to explain the principles of the disclosure. The drawings are only illustrative of certain embodiments and do not limit the disclosure.

Figure 1A:
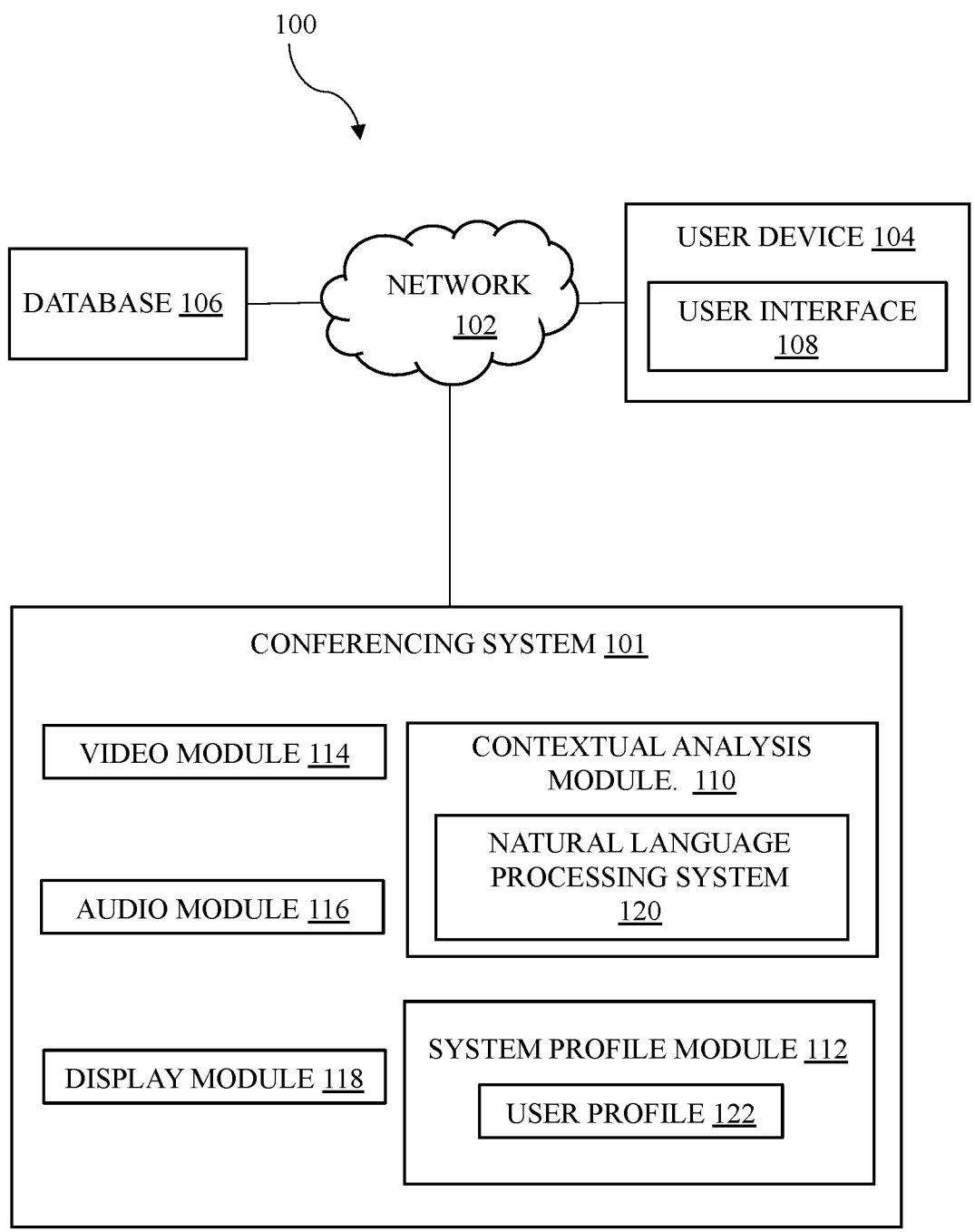
FIG. 1A illustrates a network diagram depicting networking environment 100, in accordance with embodiments of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present invention relate generally to modifying media feeds, and more particularly to modifying a communication feed during a conference call or conference meeting. A communication feed refers to the different feed information captured from environment associated with a conferencing call by various devices discussed herein. While the present invention is not necessarily limited to such applications, various aspects of the disclosure may be appreciated through a discussion of various examples using this context.

Traditional conferencing systems connect one or more parties via an audio feed or a video feed, allowing collaboration between parties. These systems have become a key component to many workplaces and homes, allowing colleagues and family members to keep in contact despite long distances. Despite the growing dependency on conferencing systems, most systems remain one dimensional and stagnant, providing participating parties little to no options to adjust the conferencing system to suit their needs.

Embodiments of the present invention are directed to a conferencing system configured to modify the communication mode (e.g., video and audio) of a conference call based, at least in part, on analyzing contextual activity (i.e., activity associated with a participating party's environment) related to the conference call. For example, a first party and a second party are collaborating on a project during a conference call and agree to take a coffee break before continuing their collaboration.

In many scenarios using traditional conferencing systems, the first party and the second party would be required to either end their call and chance not being able to reconnect after the coffee break or let the conference call continue for the duration of their coffee break. These traditional methods of dealing with breaks while maintaining live media interactions or conference calls can lead to, for example, unnecessary wastage of computing power, device battery, bandwidth, and the exchange of irrelevant information. While in some scenarios, ending the conference call would reduce many of the aforementioned drawbacks, if the two parties end the conference call and come back to the meeting at different times, this could lead to misconceptions on availability and disruptions to the project collaboration.

Embodiments of the present invention are further directed to a conferencing system configured to modify the communication mode of a conferencing system based, at least in part, on a system profile or user profile of one or more of the parties participating in a conference call. For example, a party to the conference call can alter/modify the communication feed to have more than or less than all of the visual and/or audible components present in the environment the communication feed is capturing. Such embodiments can reduce the need for parties to prepare an environment where a conference call might take place to ensure the environment is visually presentable and unlikely to receive visual or audio disruptions.

Embodiments of the present invention provide a more robust way for parties to constructively participate in conference calls. Embodiments can include, but are not limited to: analyzing contextual activity to determine contextual situations (e.g., a mode switch indicator) that, once observed during the conference call can trigger particular action strategies (e.g., communication mode switching); modifying audio transmitted during a conference call by adding and/or subtracting audio components (e.g., voices and sounds) based, at least in part, on a user profile; and modifying video transmitted during a conference call by adding and/or subtracting visual components (e.g., people and objects). These embodiments and others can allow a participating party (e.g., a first party) to tailor a conference call by controlling what the other contributing parties (e.g., a second party) see and hear during the conference call. Observing the contextual activity associated with the conference call can allow the conferencing system to learn a party's behavior (i.e., in different contextual situations) and automatically adjust the particular auditory and visual data that should be modified to improve the conferencing experience.

Conferencing system embodiments disclosed herein can be configured to observe the conversation between multiple parties of a conference call, identify the phrase "coffee break" as a contextual situation, which triggers an action strategy that automatically idles or pauses video transmitted by the communication devices of the respective parties. In this example, the action strategy can further include displaying a countdown of the time until the video transmitted by the communication devices resumes. In these embodiments, the time could be based on the learned duration of past coffee breaks (e.g., using machine learning models). In this exemplary embodiment, conferencing system circumvents many of the negative aspects of traditional conferencing systems that might have occurred without the mode switch change. Since the video of the conference call is idled or paused, there is minimal computer power wastage, reduced bandwidth issues, and little to no irrelevant information exchanged between the parties.

Turning now to the figures, FIG. 1A illustrates an example networking environment 100, in accordance with embodiments of the present invention. FIG. 1A provides an illustration of only one implementation and does not imply any limitations with regard to the environments in which different embodiments may be implemented. Many modifications to the depicted environment may be made by those skilled in the art without departing from the scope of the invention as recited by the claims.

Networking environment 100 can include network 102, user device 104, database 106 and conferencing system 101 (e.g., a system) for analyzing contextual activity and modifying the communication feed during a conference call to increase user engagement. Conferencing system 101 can be implemented as an application running on a user's computing device, as a service offered via the cloud, as a web browser plugin, as a smartphone application, or as a codependent application attached to a secondary application (e.g., as an "overlay" or a companion application to a partner application, such as a text messaging application).

Network 102 can be any type or combination of networks. For example, network 102 can include any combination of personal area network (PAN), local area network (LAN), metropolitan area network (MAN), wide area network (WAN), wireless local area network (WLAN), storage area network (SAN), enterprise private network (EPN), or virtual private network (VPN). Network 102 can refer to an IP network, and may include one or more wired and/or wireless networks that are capable of receiving and transmitting data, voice, and/or video signals, including multimedia signals that include voice, data, and video information. For example, database 106 can communicate with various user devices 104 (e.g. tablets, laptops, smartphones, portable terminals, conferencing device components, user device 104, etc.) over the Internet.

In some embodiments, network 102 can be implemented within a cloud computing environment, or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over network 102. Cloud computing is discussed in greater detail in regard to FIGS. 9A-10.

User device 104 can be a laptop computer, tablet computer, smartphone, smartwatch, or any other computing device that allows for a user to interact with and execute the methods and/or techniques described herein. In various embodiments, user device 104 can provide a user with one or more modes of communication during a conference or remote meeting. As described herein, a communication feed or communication mode can include video, audio, images, and or text (e.g., closed captioning or subtitles) that is transmitted, communicated, or otherwise presented via a communication device. User device 104 can represent any programmable electronic devices or combination of programmable electronic devices, capable of executing machine readable program instructions and as well as capable of communicating with other computing devices (not shown) within networking environment 100 via network 102. Furthermore, user device 104 can comprise a plurality of devices, both stationary and portable, that enable a user to be mobile during a conference meeting.

In embodiments, user device 104 includes user interface 108. User interface 108 provides an interface between each user device 104 and conferencing system 101. User interface 108 can be a graphical user interface (GUI), a web user interface (WUI) or any other suitable interface for a user to interact with and execute the methods and/or techniques described herein.

In embodiments, database 106 can be configured to store a wide variety of media/data, as contemplated herein. For example, media may include still images, videos, music, audio recordings, repositories of contextual activity, repositories of system data (e.g., contact information for collaborating parties) system profiles associated with system profile module 112 (e.g., user profile 122) and/or any other type of media or media libraries a participating party/user may wish to add or use in conjunction with conferencing system 101. In embodiments, database 106 can reside on a single server, on multiple servers within a cloud computing environment, on user device 104, and/or on the same physical system or virtualized system as conferencing system 101.

Conferencing system 101 can be a standalone computing system, a server, and/or a virtualized system running on one or more servers within a cloud networking environment capable of analyzing contextual activity and modifying the communication feed during a conference meeting for participating parties/users connected to network 102. Conferencing system 101 can include contextual analysis module 110, system profile module 112, video module 114, audio module 116, and display module 118. The term "module" may refer to a hardware module, software module, or a module may be a combination of hardware and software resources. Embodiments of hardware-based modules may include self-contained components such as chipsets, specialized circuitry, one or more memory devices and/or persistent storage (see FIG. 10). A software-based module may be part of a program (e.g., programs 1028, FIG. 10), program code or linked to program code containing specifically programmed instructions loaded into a memory device or persistent storage device of one a data processing systems operating as part of the networking environment 100. For example, data associated with contextual analysis module 110, system profile module 112, video module 114, audio module 116, and/or display module 118, depicted in FIG. 1, can be loaded into memory or database, such as database 106.

In embodiments, user device 104 can be a component of conferencing system 101. In these embodiments user device 104 can include all of the components, or fewer than all the components necessary to implement conferencing system 101. For example, video module 114, audio module 116, and/or display module 118 can be configured on user device 104 while contextual analysis module 110 and system profile module 112 can be configured on a separate device.

In embodiments, conferencing system 101 can utilize one, some, or all of the modules and/or their described herein sub-components depicted in FIG. 1A to analyze contextual activity and modify a communication feed during a conference meeting. A communication feed can include an audio feed and a video feed obtained from conferencing system 101 during a conferencing call or meeting. Using video module 114 and audio module 116, conferencing system 101 can modify the communication feed acquired from the first party in a variety of different ways before displaying the modified communication feed to the other parties participating in the conferencing meeting. These possible modifications include but are not limited to: i) switching between communication modes, ii) adding and subtracting audio components from the audio feed, and iii) adding and subtracting video components (both moving and still images) from the video feed.

In some embodiments, modifications made to the communication feed are performed based on a contextual analysis module 110. In these embodiments, contextual analysis module 110 can observe contextual activity from the communication feed, identify contextual situations from contextual activity, and determine particular action strategies or responses to the contextual situation. Action strategies can include, but are not limited to: i) obscuring a person from the communication feed who is not authorized as a contributing member to a party of the conference meeting (e.g., a person has not opted-in to the conference meeting), ii) starting a conferencing meeting, iii) increasing or decreasing the volume heard by parties contributing to the conferencing meeting, or iv) switching the conference meeting from a video mode to an audio mode.

In embodiments, contextual analysis module 110 can be configured to analyze the communication feed of a user or parties using conferencing system 101 to detect contextual activity. Contextual activity can refer to the visual and/or audio activity associated with the participating parties/users and their surrounding environment captured by conferencing system 101 (e.g., conversations among members of a party). Contextual analysis module 110 can extract relevant and topical information from the contextual activity of the audio and video feeds using a variety of techniques and devices including, but not limited to: Regional-Based Convolutional Neural Network (R-CNN) enabled IP cameras, Mel Frequency Cepstral Coefficients (MFCCs), topic modeling (e.g., latent dialect allocation (LDA) and Natural Language Processing (NLP)), Fast Fourier Transforms, machine learning modeling (e.g., Bi-LSTM), or any combination thereof.

In some embodiments, contextual activity can be observed from the video feed, while in other embodiments contextual activity can be detected from the audio feed. IoT sensor feeds can be used to detect contextual activity arising from both video feeds and audio feeds. This contextual activity or information, whether identified from the video feed and/or the audio feed, can be used to identify particular contextual situations via a natural language processing system 120, (e.g., see description of FIG. 1B) to create a pattern history of the participating parties or users. While in some circumstances a contextual situation might be directly identified by receiving input from a participating party or user, in other circumstances a contextual situation can be discerned using statistical modeling, deep learning models, machine learning models, or a combination of all three. Once a contextual situation is identified by contextual analysis module 110, an action strategy can be determined.

An action strategy can refer to a rule or dynamic set of rules that once triggered in conferencing system 101, as a result of observing a particular contextual situation in the contextual activity, can result in simple communication feed changes (e.g., muting the audio feed), or a cascade of changes made to the communication feed (e.g., timer-based activities). While action strategies can be determined by a party/user participant, action strategies can also be determined using a repository of historical contextual activity detected in communication feeds associated with a party/user using conferencing system 101 to discern likely action strategies based on statistical modeling, deep learning, machine learning, or any combination thereof. In embodiments, once an action strategy is triggered and/or completed, it can be reconfigured to reinforce the learning of conferencing system 101 and can improve on the effectiveness of the action strategy when it is next triggered. In some of these embodiments, a party/user is prompted to provide input regarding the accuracy or effectiveness of a particular action strategy, while in other embodiments contextual analysis module 110 evaluates the party's/user's response by analyzing the relevant contextual activity associated with the action strategy event. Once contextual situations and action strategies are identified and determined from the contextual activity, they can be added to system profile module 112. While in some embodiments, modifications made to the communication feed can be based on contextual analysis module 110, in other embodiments, such modifications can be based on system profile module 112, or a combination of contextual analysis module 110 and system profile module 112.

In embodiments, system profile module 112 can include rules or action strategies derived from contextual analysis module 110 (e.g., contextual situations and action strategies determined from a history of past conference meetings), as well as rules and action strategies established by an administrator, a party, or a member of a party participating in the conference meeting. The rules and action strategies associated with system profile module 112 can also be included in user profile 122.

In embodiments, user profile 122 can be configured to include all or some of the rules or action strategies associated with system profile module 112, as well as specific party/user preferences regarding the communication feed during a conference meeting or call. In other words, a party/user can identify particular audio (e.g., sounds, voices, etc.), video (objects, people, etc.), or static images that should be modified from the communication feed (i.e., audio feed and video feed) during a conference meeting, and those identified preferences can be added to user profile 122. Conferencing system 101 can include any number of user profile 122 or sub-user profiles. In other words, conferencing system 101 can include multiple user profile 122 comprising different rules to be applied to different parties, enabling rules or action strategies to be applied disproportionately among the participating parties and their members during a conference meeting. In embodiments, user profile 122 can include action strategies and rules (e.g., contextual situations) that govern all parties (e.g., a first party, a second party, etc.) participating in a conference call or meeting, action strategies and rules that are specific to each participating party (e.g., apply only to a first party and not a second party), action strategies and rules that are specific to each member of a participating party (e.g., within the first party, a first person and a second person can each have a separate user profile with different rules/action strategies), or any combination of all three types of user profiles. User profile 122 can include any number of rules and action strategies. These rules and action strategies can include, but are not limited to: modifying the audio feed by adding or subtracting audio components, modifying the video feed by adding or subtracting video components, and switching conference meeting modes during the conference meeting. In embodiments, many of these action strategies are implemented using all or less than all of video module 114, audio module 116, and display module 118. In embodiments, information and data associated with user profile 122 can be configured and stored on database 106 and accessed as necessitated by conferencing system 101. Depending on a participating party's/user's preferences, user profile 122 can be further configured to include a repository of outgoing or incoming telephone numbers, IP addresses, emails, and other information associated with identification.

In embodiments, video module 114 can be configured to analyze video and images to identify objects, locations, people, etc. from the viewable environments from the communication feed in conferencing system 101. In some embodiments, video module 114 can receive video feed from intelligent camera networks such as R-CNN enabled IP cameras to detect a user's or a parties' contextual activity and/or the contextual activity between a first party and a second party. In other embodiments, video module 114 can provide the video feed to contextual analysis module 110 to analyze the contextual activity of a party/user and/or the contextual activity between a first party and a second party of a conference call. Video module 114 can include any number of video devices (such as, cameras, video devices, and/or Internet of Things (IOT) sensor feeds) necessary to provide the conferencing call functions described herein, such as facial and speech recognition technology and video modification technology. Using facial recognition, video module 114 can be configured to determine the facial or video parameters used to identify a person. Once identified, those facial or video parameters can be added to the appropriate user profile 122 where they can be used to identify or acknowledge whether a person of a party has opted-in to the conference meeting, and thus can contribute to the communication feed of a conference meeting.

In embodiments, video module 114 can be further configured to modify the video feed of a communication feed during a conference meeting. Video module 114 can use a variety of techniques to modify the video feed including, but not limited to: obscuring or eliminating a person either not recognized by conferencing system 101 via user profile 122 or that has not opted-in to a conference call and adding or subtracting objects or people from the video feed by creating a digital patch. In some embodiments, the material to be added or subtracted from the video feed is based, at least in part, on information included in user profile 122, of which such information may be determined prior to the beginning of a conference meeting. In some embodiments, the material to be added or subtracted from the video feed is based, at least in part, on information determined during the conference call, of which such information is subsequently added to user profile 122. For example, conferencing system 101 can also be configured, via video module 114, to identify during the conference call, whether an object or person should be added or subtracted from the video feed (e.g., based on a party dynamically opting-in to the conference call after the conference call has started), as well as how the object or person should be added or subtracted from the communication feed. While in some embodiments video module 114 and audio module 116 are separate modules, in other configurations video module can be configured to include audio module 116.

In embodiments, audio module 116 can be configured to analyze an audio feed from the communication feed of conferencing system 101 to identify people (i.e., via voice audio, such as spoken utterances), and various sounds from the environment audio (i.e., background noise). In some embodiments, audio module 116 detects a party's/user's contextual activity and/or the contextual activity between a first party and a second party using analysis techniques such as, topic modeling, neural networks, IBM WATSON® and/or machine learning modeling. In other embodiments, audio module 116 provides an audio feed to contextual analysis module 110 to analyze the contextual activity of a party and/or the contextual activity between a first party and a second party of a conference call. Audio module 116 can include any number of audio devices (such as, audio devices, and/or Internet of Things (IOT) sensor feeds) necessary to provide conferencing call functions described herein, such as speech recognition, conversation detections, and audio modification. Using voice recognition, audio module 116 can be configured to determine voice parameters (e.g., power bandwidth) that can be used to distinguish between the voice of each person of a party/user and identify a person. Once identified, those audio parameters can be added to the appropriate user profile 122 where they can be used to identify or acknowledge whether a person of a party can contribute to the audio feed of a conference meeting.

In embodiments, audio module 116 can be further configured to modify the audio feed of a communication feed during a conference meeting. Audio module 116 can use a variety of techniques to modify the audio feed including, but not limited to: removing a particular unwanted audio component (e.g., a sounds, voices, and/or spoken utterances) either not recognized by conferencing system 101 via user profile 122 or generated from a person that has not opted-in to a conference call, overlaying a wanted or desired audible component over an unwanted audible component, and eliminating the unwanted audio component with destructive interference (e.g., by producing a sound having 180 degree phase shift to eliminate the soundwaves produced by the unwanted audio component. In some embodiments, the material to be added or subtracted from the audio feed is based at least in part on information included in user profile 122 determined prior to beginning a conference meeting. In these embodiments, audio module 116 can be further configured to either identify or request input from a party/user on whether an audio component or voice, not already identified/included as part of user profile 122, should be added or subtracted from the audio feed (i.e., communication feed), and whether the sound or voice should then be added to user profile 122 of the party/user. In some embodiments, the material to be added or subtracted from the video feed is based, at least in part, on information determined during the conference call (i.e., contextual activity), of which such information is subsequently added to user profile 122. For example, conferencing system 101 can also be configured, via audio module 116, to identify during the conference call, whether an object or person should be added or subtracted from the video feed (e.g., based on a party dynamically opting-in to the conference call via a user profile after the conference call has started), as well as how the object or person should be added or subtracted from the communication feed.

In embodiments, display module 118 can be configured to provide or display any information or data associated with the parties and/or users of conferencing system 101 during a conferencing call. In some embodiments, display module 118 can be configured to analyze the audio of one party. In these embodiments, display module 118 and associated display devices can utilize any number of known speech to text techniques to convert the audio feed to text, subtitles, or closed caption. For example, a conference meeting audio feed associated with a first participating party can be converted to text and displayed to a second participating party as a closed caption. This embodiment could ensure that information conveyed during a conference call is not lost, in situations where loud noise reduces that audibility of a person's voice. Display module 118 may be a standalone module or may be a sub-module of audio module 116 and/or video module 114. In some embodiments, display module 118 can be configured, either through contextual analysis module 110 or by system profile module 112 to remove specific words (e.g., words a party might find offensive) or edit a transcribed audio feed (e.g., edit a displayed conversation to have proper grammar).

Figure 1B:
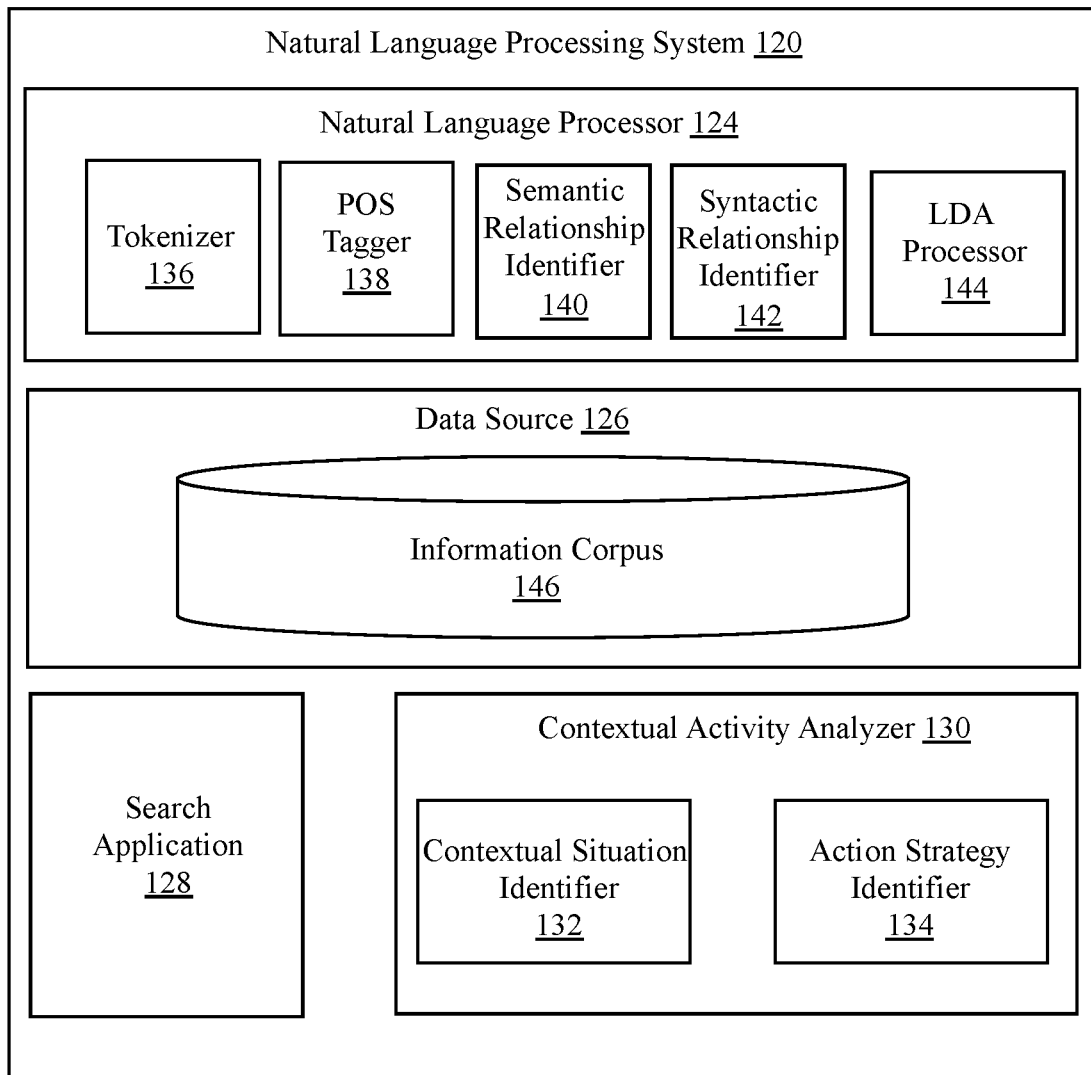
FIG. 1B illustrates a block diagram of an example natural language processing system 120, configured to analyze contextual activity associated with a communication feed, in accordance with embodiments of the present invention.

FIG. 1B illustrates a block diagram of a natural language processing system 120, configured to contextually analyze contextual activity associated with audio and video feeds during a conferencing meeting, in accordance with embodiments of the present invention. In some embodiments, conferencing system 101 may submit a communication feed (e.g., audio feed and video feed) from video module 114, audio module 116, and/or display module 118, containing contextual activity (i.e., conversations, sounds, video, and images) associated with at least one party of a conference call to be analyzed by natural language processing system 120. Natural language processing system 120 can use the contextual activity to identify particular contextual situations and determine possible actions strategies. In some embodiments, natural language processing system 120 can include a text-to-speech analyzer, allowing for contextual activity (e.g., conversations of first party) to be transcribed. In these embodiments the transcribed contextual activity can then be analyzed by natural language processing system 120. In embodiments of conferencing system 101 using display module 118 to display text or closed caption of an audio feed, natural language processing system 120 can be further configured to receive electronic documentation of the display and proceed with analyzing the text.

In some embodiments, the natural language processing system 120 can include a natural language processor 124, data source 126, a search application 128, and a contextual activity analyzer 130. Natural language processor 124 can be a computer module that analyzes the received unstructured textual conversation transcript(s) of the contextual activity and other electronic documents. Natural language processor 124 may perform various methods and techniques for analyzing the contextual activity of the communication feed (e.g., syntactic analysis, semantic analysis, etc.). Natural language processor 124 may be configured to recognize and analyze any number of natural languages. In some embodiments, the natural language processor 124 may parse one or more sections of a transcribed contextual activity into one or more subdivisions.

Further, the natural language processor 124 may include various modules to perform analyses of transcribed contextual activity. These modules may include, but are not limited to, a tokenizer 136, a part-of-speech (POS) tagger 138 (e.g., which may tag each of the one or more subdivisions in which storage requirements and/or storage costs are identified), a semantic relationship identifier 140, and a syntactic relationship identifier 142.

In some embodiments, the tokenizer 316 may be a computer module that performs lexical analysis. The tokenizer 316 may convert a sequence of characters (e.g., images, sounds, etc.) into a sequence of tokens. A token may be a string of characters included in a contextual activity (e.g., conversation) and categorized as a meaningful symbol. Further, in some embodiments, the tokenizer 136 may identify word boundaries in the contextual activity and break any text within the contextual activity into their component text elements, such as words, multiword tokens, numbers, and punctuation marks. In some embodiments, the tokenizer 136 may receive a string of characters, identify the lexemes in the string, and categorize them into tokens.

In some embodiments, in addition to the tokenizer 136 and/or separately from the tokenizer 136, the natural language processing system 120 may include a component that performs document to vector natural language processing functions. For example, transcribed contextual activity can be parsed into their component words and the words will subsequently be transformed into associated vectors that will then be used for natural language analysis.

Consistent with various embodiments, the POS tagger 138 may be a computer module that marks up a word in a recording to correspond to a particular part of speech. The POS tagger 138 may read a passage or other text in natural language and assign a part of speech to each word or other token. The POS tagger 138 may determine the part of speech to which a word corresponds based on the definition of the word and the context of the word. The context of a word may be based on its relationship with adjacent and related words in a phrase, sentence, or paragraph. In some embodiments, the context of a word may be dependent on one or more previously analyzed contextual activities (e.g., the contextual activity of a past conference meeting may shed light on the meaning of one or more possible contextual situations in another conference meeting). Examples of parts of speech that may be assigned to words include, but are not limited to, nouns, verbs, adjectives, adverbs, and the like. Examples of other part of speech categories that POS tagger 138 may assign include, but are not limited to, comparative or superlative adverbs, wh-adverbs, conjunctions, determiners, negative particles, possessive markers, prepositions, wh-pronouns, and the like. In some embodiments, the POS tagger 138 may tag or otherwise annotate tokens of the contextual activity with part of speech categories. In some embodiments, the POS tagger 138 may tag tokens or words of a recording to be parsed by the natural language processing system 120.

In some embodiments, the semantic relationship identifier 140 may be a computer module that may be configured to identify semantic relationships of recognized subjects (e.g., words, phrases, videos, images, etc.) in the contextual activity. In some embodiments, the semantic relationship identifier 140 may determine functional dependencies between entities and other semantic relationships.

Consistent with various embodiments, the syntactic relationship identifier 142 may be a computer module that may be configured to identify syntactic relationships from the contextual activity of a communication feed, composed of tokens. The syntactic relationship identifier 142 may determine the grammatical structure of sentences such as, for example, which groups of words are associated as phrases and which word is the subject or object of a verb. The syntactic relationship identifier 142 may conform to formal grammar.

In embodiments, natural language processor 124 can be configured to include Latent Dirichlet Allocation (LDA) processor 144. While in some embodiments LDA processor 144 can be configured to work with one or more of the other components pertaining to natural language processor 124 to identify contextual situations from contextual activity, in other embodiments LDA processor 144 performs all the analysis for natural language processor 124. LDA processor 144 can generally be understood to be a generative statistical model that implements aspects of machine learning to enable topic modeling of a given situation (e.g., determining a contextual situation from contextual activity) and/or keyword processing. LDA processor 144 can include, but is not limited to the following stages: i) tokenization; ii) stop word removal; iii) lemmatizing (i.e., changing words in third person to first person and verbs having a past or future tense to the present tense); and iv) stemming (i.e., reducing words to their root form).

In some embodiments, the natural language processor 124 may be a computer module that may group sections of the contextual activity into subdivisions and generate corresponding data structures for one or more subdivisions of the contextual activity. For example, in response to receiving the contextual activity at the natural language processing system 120 via conferencing system 101, the natural language processor 124 may output parsed text elements from the report as data structures. In some embodiments, a subdivision may be represented in the form of a graph structure. To generate the subdivision, the natural language processor 124 may trigger computer modules 136-144.

In some embodiments, the output of natural language processor 124 may be used by search application 128 to perform a search of a set of (e.g., one or more) corpora to retrieve one or more subdivisions including a particular requirement associated with the contextual activity and send the output (i.e., contextual situation) to a word processing system and to a comparator. As used herein, a corpus may refer to one or more data sources, such as data source 126. In some embodiments, data source 126 may include video libraries, data warehouses, information corpora, data models, and document repositories, and a historical repository of communication feed associated with conferencing system 101. In some embodiments, data source 126 may include an information corpus 146. Information corpus 146 may enable data storage and retrieval. In some embodiments, information corpus 146 may be a subject repository that houses a standardized, consistent, clean, and integrated list of words, images, and dialogue. For example, information corpus 146 may include verbal statements made by a storage provider representative (e.g., a phone message where a representative states that 1 terabyte of cloud storage can be provided by their storage provider). The data may be sourced from various operational systems. Data stored in information corpus 146 may be structured in a way to specifically address reporting and analytic requirements. In some embodiments, information corpus 146 may be a relational database or a text index.

In some embodiments, the contextual activity analyzer may be a computer module that elucidates contextual situations or action strategies by identifying conversational topics and/or related components among the contextual activity. In some embodiments, the contextual activity analyzer 130 may include a contextual situation identifier 132 and an action strategy identifier 134. When the contextual activity is received by the natural language processing system 120, the contextual activity analyzer 130 may be configured to analyze the contextual activity using natural language processing, and in some embodiments LDA processing, to identify a particular contextual situation. In some embodiments, contextual activity analyzer 130 may first identity one or more requirements in the contextual activity using the natural language processor 124 and related sub-components 136-144.

After identifying a particular contextual situation of the contextual activity using the contextual situation identifier 132, the action strategy identifier 134 can then be configured to analyze the contextual situations and the contextual activity immediately surrounding the contextual situation associated with a particular topic to determine or identify an action strategy. While in some embodiments action strategies are determined by contextual activity analyzer 130 of natural language processing system 101, in other embodiments action strategies can be determined using deep learning and machine learning models (e.g., Bi-LSTM and R-CNN ML models), or any combination of techniques discussed herein. While not specifically identified herein, contextual activity analyzer 130 can also have additional sub-components configured to aid contextual situation identifier 132 and action strategy identifier 134, sentiment analysis and question answering.

Figure 2:
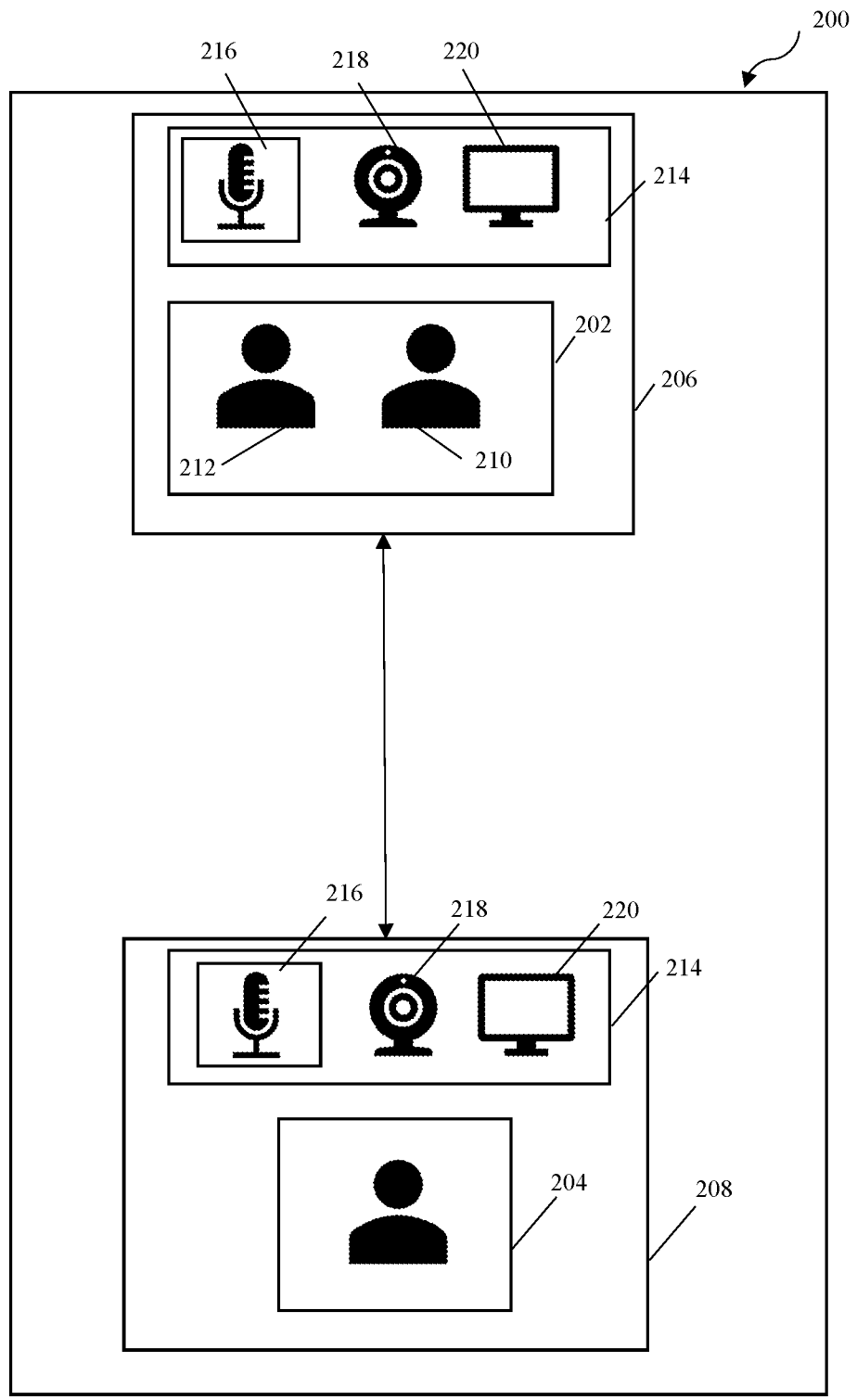
FIG. 2 illustrates an example conferencing system 200 configured to perform one or more actions described herein, in accordance with embodiments of the present invention.

FIG. 2 is an illustrative example of a conference call or meeting in conferencing system 101, generally designated 200, in accordance with at least one embodiment of the present invention. Conference call 200 enables communication between two or more parties, (i.e., first party 202 and second party 204) who are likely in different locations (i.e., first environment 206 and second environment 208, respectively). While conference call 200 can include any number of parties, for brevity, only two participating parties are discussed herein. In some embodiments, a party can be defined as a participant of a conference call or meeting, having one or more people that can be governed by a user profile or system profile. In some embodiments, a party can be defined as a person who has opted-in to the conference call or meeting. For example, a person may actively opt-in to a conference call or a person may automatically be opted-in to a conference call based on conferencing system 101 identifying a person based on the person's facial or voice characteristics and determining that the identified person should be opted-in to the conference call.

In embodiments, first party 202 and second party 204 can each have access to communication feed 214. Communication feed 214 can include one or more of, audio feed 216, video feed 218, or display feed 220. As discussed herein, conferencing system 101 can observe contextual activity from communication feed 214, to identify particular contextual situations. Contextual activity can include, but is not limited to, sound, voice audio (e.g., spoken utterances), and images, such as objects or people, that are observed or captured in association with respective participating parties and their environments. Contextual activity may be collected from all participating parties, but can be used to identify contextual situations for less than all parties participating in a conference call. For example, contextual activity can be captured or collected from both first party 202 and second party 204, but only used to develop contextual situations or action strategies associated with first party 202. A contextual situation can refer to particular contextual activities or indicators (either visual or audio) that are observed before the occurrence of specific events or actions and are determined to correlate to the performance of those events or actions (e.g., saying "let's take a coffee break" could proceed the event of taking a coffee break). In some embodiments, conferencing system 101 can determine an appropriate action strategy, or method of responding to the contextual situation.

In embodiments, conferencing system 101 can identify a mode switch indicator. A mode switch indicator can be a particular type of identified contextual situation that indicates communication feed 214 should be switched from one meeting mode to another meeting mode. Switching one meeting mode to another meeting mode can include switching communication feed 214 from one feed type to a different feed type (i.e., video feed to audio feed), switching a meeting from a stationary mode to a mobile mode (e.g., a desktop computer), or any combination thereof. Examples of a mode switch indicator can include, but is not limited to, the following examples: i) IoT sensor feed indicates first person 210 has left first location 206 and is no longer contributing to communication feed 214, ii) observing relevant conversation, video, or images, such as those identified by natural language processing system 120 (e.g., see description of FIGS. 1A-1B), and iii) IoT sensor feeds indicate the lights have been turned on or off.

In embodiments, responsive to observing a particular mode switch indicator in the contextual activity, a specific action strategy associated with the specific mode switch indicator can induce communication feed 214 of conference call 200 to switch, from a first meeting mode (e.g., video call) receiving a first feed type (e.g., video feed) during the conference meeting (i.e., call), to a second meeting mode of the communication feed (e.g., audio call) receiving a second feed type (e.g., audio feed). Possible mode switch changes can include, but are not limited to, the following examples: i) temporarily idling/pausing the audio and/or video for a duration based, at least in part on past contextual activity of the party/user, ii) switching communications modes (e.g., from audio feed 216 to video feed 218 for a predetermined duration of time or vice versa, iii) switching from audio or video, to text messages, subtitles, or closed captioning for a predetermined time period or vice versa, iv) turning off the conference based on identifying a contextual situation indicative that the conference call should be ended or paused (e.g., when first party 202 and second party 204 leaves first location 206 and second location 208, respectively), and then unpausing or redialing the conference call once first party 202 and second party 204 have returned.

In one exemplary embodiment, first party 202 and second party 204 are participating in a conference call or meeting 200. During conference call 200, a disruptive sound begins in the background of first location 206 associated with first party 202. The disruptive sound prevents audio feed 216 from being audible to either first party 202 or second party 204. Conferencing system 101 can identify the disruptive sound as a mode switch indicator (e.g., based on decibel level). A possible action strategy is then selected, which can include using display feed 220 to transcribe the live conversation and display the conversation as text on a screen, while still also communicating with video feed 218. This action strategy would allow the conference call to continue without significant disruption or delay. If the disruptive sound were to suddenly end or be significantly reduced during the conference call (e.g., the disruptive sound falls below a decibel threshold level), conferencing system 101 can identify the cessation of sound as a second mode switch indicator (i.e., reduction of decibel level). The identification of a second mode switch indicator could prompt or trigger a second action strategy capable of switching the second communication mode to the first communication mode, or in some embodiments, to a third communication mode that is different than either the first communication mode or second communication mode. For example, a conference call could be switched from a video feed mode to an idle mode, and then from the idle mode to an audio feed mode.

In embodiments, contextual situations (e.g., mode switch indicators) and action strategies can be configured and reconfigured/reinforced to improve the responsiveness of conferencing system 101 to the participating parties. Contextual situations and action strategies can be configured and reconfigured/reinforced by using various techniques (e.g., machine learning models) to analyze the contextual activity surrounding either the contextual situation or the action strategy (e.g., see description of FIGS. 1A-1B). In some embodiments, contextual situations and action strategies are determined using a historical repository of past conference calls to identify patterns in a party's contextual activity over time. For example, based on the repository of contextual activity conferencing system 101 can determine that when a party states, "I have to walk my dog," and begins moving toward a door (i.e., a contextual situation), that first party 202 will be away from the conference meeting for some duration (e.g., between a range of times) before returning. In this example, conferencing system 101 can use past conferencing calls to determine the amount of time first person 202 requires to walk their dog. While first person 202 is away from conferencing system 101 and not participating in the conference call, the conference call can be switched from an active communication feed, having either a video or audio feed, to an idle mode. This mode switch can allow for a reduction in electricity usage and the exchange of superfluous material.

In embodiments, conferencing system 101 can be further configured to learn and provide estimates on the duration of a mode switch (e.g., break) depending on the task, to develop timer-based activities during a conferencing call. In another exemplary embodiment, first party 202 can decide to take a break from the conference call with second party 204. Conferencing system 101 can be configured to recommend the estimated time interval first party 202 will be on their break and display the estimated time interval to second party 204. In these embodiments, any known timer, such as a GUI enabled timer, can be relayed to second party 204 to display the estimated time interval. This estimated time interval can be assessed using past contextual activity and analyzing the contextual activity using the techniques discussed herein (e.g., see description of FIGS. 1A-1B).

In some embodiments, conferencing system 101 may be configured to have predefined timer-based activities, that are not based on the contextual activity of the participating parties of a conference call. A participating party can be provided with knowledge of a particular contextual situation (e.g., provided with a keyword) that will knowingly trigger an action strategy for a predetermined amount of time. Alternatively, a timer-based activity can be associated with certain contextual situations and action strategies that only occur at specific times during the day/night. For example, a participating party may work from a home that she shares with her family. In this example, either through input from the participating party or through analysis of the contextual activity, conferencing system 101 may have contextual situations and action strategies that are specific to the hours the participating party is working and those action strategies would not be triggered by contextual situations outside of those working hours. In many embodiments, contextual situations, action strategies, as well as information associated with determining and identifying contextual situations and action strategies (e.g., facial and voice recognition), are added and maintained in a party's user profile 122 to be retrieved if needed for future conference meetings.

In these embodiments, the repository can include contextual situations and action strategies that can be further reconfigured/reinforced by requesting and receiving feedback from the participating parties and their respective members. Using this feedback, conferencing system 101 can ensure that contextual situations and action strategies are implemented correctly.

In embodiments, conferencing system 101 can be configured to request feedback when an action strategy is triggered (i.e., contextual situation is observed), but before initiating that action strategy. By asking for feedback, conferencing system 101 can be provided relevant data used to learn a new party's/user's new contextual situations and reinforce prior learned material. For example, in FIG. 2 a contextual situation, observed from the contextual activity associated with first party 202, indicates first party 202 intends to leave first environment 206. In this example, conferencing system 101 can develop relevant questions associated with the contextual situation and request answers or feedback from first party 202. For example, conferencing system 101 could be configured to establish questions asking if first party 202 intends to return to the conferencing call after they leave and, if first party 202 intends to return, how long will their break be, and what will they be doing to ensure proper categorization of the time interval for future conference calls.

In embodiments, conferencing system 101 can have one or more user profiles that can include particular rules, action strategies, facial and voice recognition information (e.g., see description of FIGS. 1A-1B). In some embodiments, a single user profile 122 can be applied to all participating parties in conference call 200, while in other embodiments each party can have a different user profile 122 (e.g., first party 202 and first party 204 can have separate user profiles), and/or each person within a party, (e.g., first person 210 and second person 212 of first party 202), can each have a separate or different user profile. In some embodiments, a mediator or an administrator can create each user profile 122 that governs how each person engages with conferencing system 101 and can be viewed in communication feed 214. Such an embodiment may be useful when conducting mediation between two remote parties, or when conducting conference calls in other professional situations where a strict code of conduct may be required.

In embodiments, there may be a hierarchy of user profile 122. For example, in situations where there are multiple user profiles, it becomes possible to have user profiles with rules and policies that conflict with other rules and policies of the participants of conferencing system 101. In such situations, one user profile can be selected and given preference over other user profiles. If conflicts with other user profiles arise with the rules and action strategies of the selected user profile, the conflicting rules and/or action strategies associated with the user profile can be overridden by the selected user profile. In some embodiments, conferencing system 101 could include a user profile for all participating parties in conferencing system 101, a user profile for each participating party, a user profile for each member or person of a party, or any combination thereof. In these embodiment, the conflicting components of the user profiles of each person belonging to a particular party can be overridden by the user profile of that particular party, and the conflicting components of the user profiles of each participating party could be overridden by the user profile for all participating parties of conferencing system 101.

Figure 3:
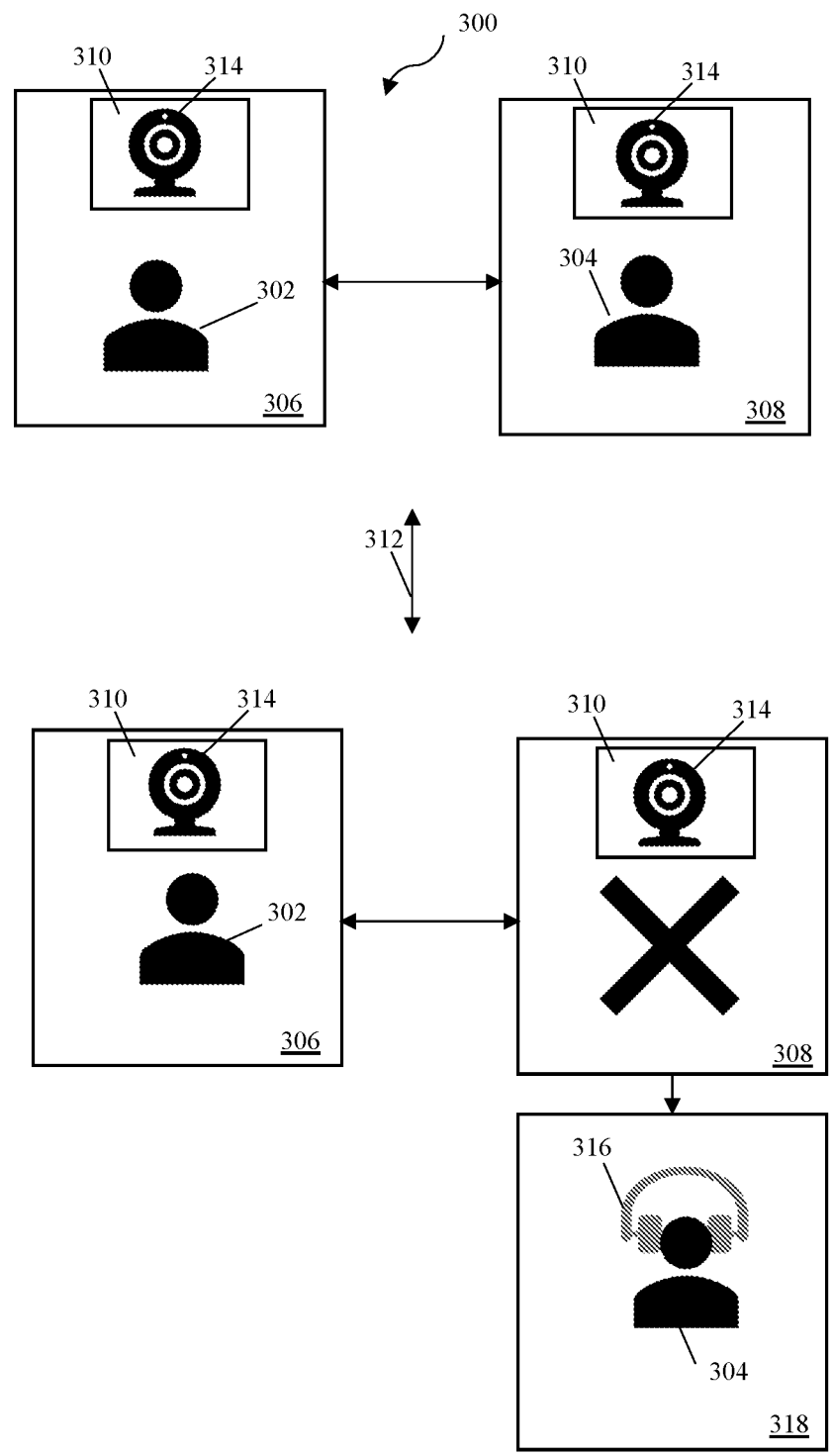
FIG. 3 illustrates an example conferencing system 300 configured to perform one or more actions described herein, in accordance with embodiments of the present invention.

FIG. 3 is an illustrative example of a conference call/meeting in conferencing system 101, generally designated 300, in accordance with at least one embodiment of the present invention. In embodiments, conferencing system 101 can also be configured to switch between different device modes when a particular mode switch indicator is identified. This embodiment can allow parties who desire to leave their current location (e.g., second environment 308) and move to another location while continuing to participate in a conference call 300.

In embodiments, conference call 300 enables communication between two or more parties, (i.e., first party 302 and second party 304) who are likely in different locations (i.e., first environment 306 and second environment 308, respectively) via communication feed 310. Conferencing system 101 can identify a particular mode switch indicator 312 from the contextual activity associated with communication feed during conference call 300. Once mode switch indicator 312 is identified by conferencing system 101 (e.g., second party 304 leaves second environment 308) from the contextual activity of communication feed 310, associated with second party 304, an action strategy can be triggered. In some embodiments, action strategy can include a party (e.g., second party 304) switching their communication feed 310 from a stationary device 314 (e.g., desktop computer) located in second environment 308 to a mobile device 316 (e.g., a smart phone or headphones) that can travel with second party as the party leaves second environment 308 to another environment 318. In some embodiments, stationary device 314 and mobile device 316 are capable of using all the same feed types (i.e., video feed, audio feed, and display feed). In other embodiments, mobile device 316 can have less than all of the feed types that are associated with communication feed 310, while stationary device 314 can be configured to have all three feed types or vice versa. Alternatively, second party 304 could initially start a conference call on a mobile mode enabled device (e.g., smart phone) while in another environment 318 and then, upon reaching second environment 308 (e.g., mode switch indicator could be a GPS location), could switch from a mobile mode device to a stationary mode device.

Figure 4:
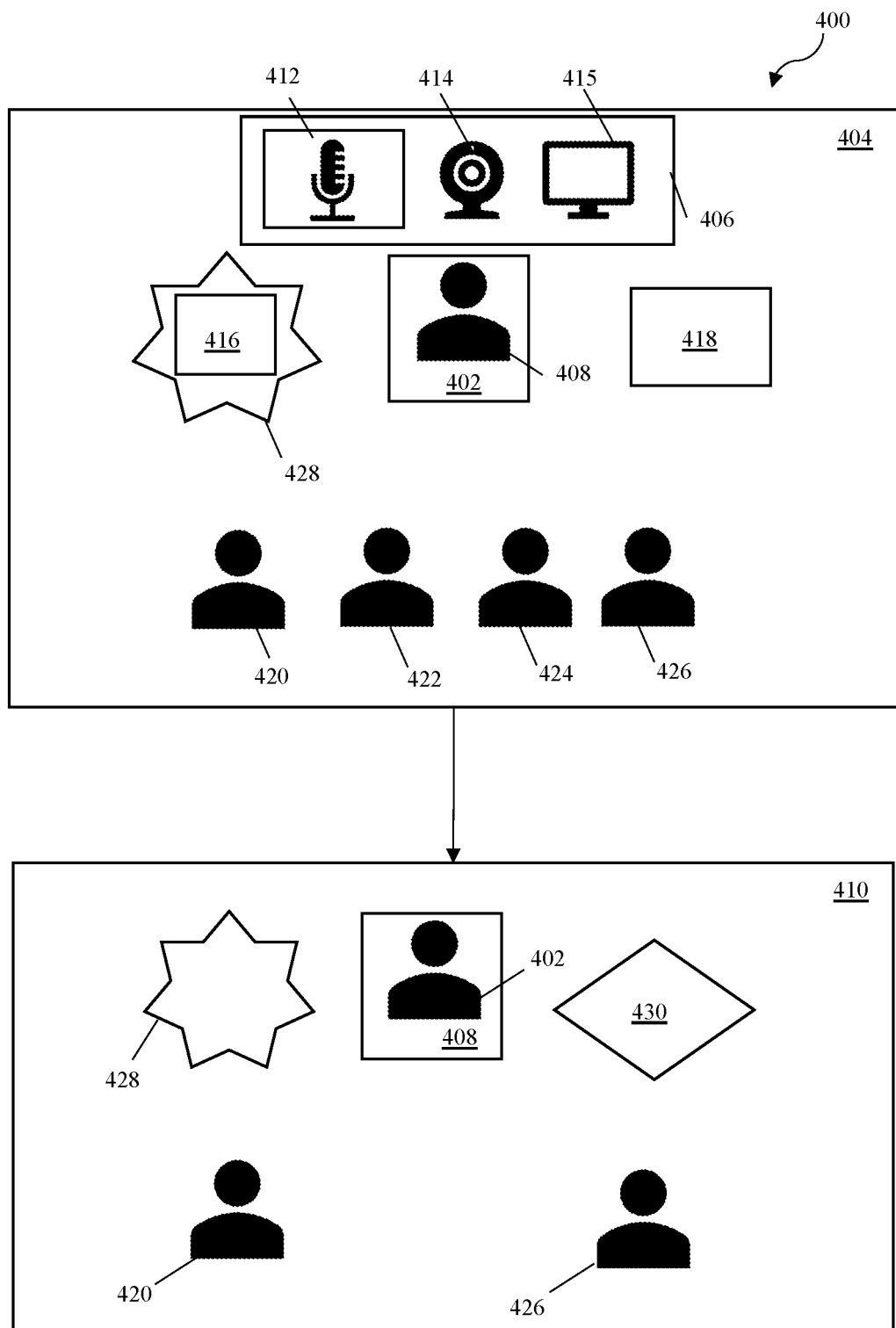
FIG. 4 illustrates an example conferencing system 400 configured to perform one or more actions described herein, in accordance with embodiments of the present invention.

FIG. 4 is an illustrative example of a party's communication feed during a conference call 400 using conferencing system 101, in accordance with at least one embodiment of the invention. As discussed herein, conferencing system 101 can include one or more user profile 122 that can be configured by a party or a member of the party (i.e., having at least one person) to actively modify the communication feed 406 (e.g., audio feed 412, video feed 414, and/or display feed 415) during a conference call. While the exemplary embodiment discussed with reference to FIG. 4 refers to the use of one user profile and one party, any combination of user profiles and parties, (i.e., one user profile for all participating parties, one user profile for each participating party, a user profile for each member or person of a party, or any combination thereof) may be used. FIG. 4 is intended to provide example embodiments regarding how conferencing system 101 may be used to control and configure a communication feed during a conference call, as well as possible methods used to control the communication feed.

The embodiment depicted in FIG. 4 can include a first party 402 in a first environment 404 having both audio and visual aspects. First party 402 can configure and control how first environment 404 and its members are viewed by communication feed 406 via at least one user profile 122 that can be retrieved from a cloud database. In some embodiments, IoT sensor feeds, neural network enabled cameras, and other devices can be used to view first environment 404 and observe or survey contextual activity. Contextual activity can include, but is not limited to, video, sound, voice audio (i.e., spoken utterances), images (e.g., objects or people) observed in first environment 404. In some embodiments, the contextual activity captured by conferencing system 101 can be collected outside the parameters of a conference call on a rolling basis to improve conferencing system 101's learning capabilities. In other embodiments, the contextual activity detected by conferencing system 101 is only collected during a conference call.

In embodiments, first party 402 can have at least one person. In this exemplary embodiment depicted in FIG. 4, first party 402 has only one member/person (i.e., first person 408). Initially, first person 408 opts into first party 402 of conferencing system 101 by creating a user profile. First person 408 can create a user profile by providing various personal parameters that can allow first person 408 to be recognized by conferencing system 101. These parameters include, but are not limited to facial parameters (parameters to be used during facial recognition), voice parameters (parameters to be used during voice recognition, such as power bandwidth), and other peripheral parameters of first person 408. A peripheral parameter can range in complexity depending on different embodiments of conferencing system 101, but could include parameters such as biometric information (e.g., retinal scanner), a particular logo, or barcode on an employee badge. These personal parameters can be stored in a user profile (e.g., on a cloud database) and can be used for (re)identification or (re)authentication purposes. Once a person is identified, their user profile can be linked to any existing rules, action strategies, or timer-based activity detection stored in a database, such as database 106. Identification can also ensure conferencing system 101 associates any additional contextual activity with the correct person. This can enable the identification of possible contextual situations associated with a particular person. While many embodiments discussed herein utilize voice and facial recognition, other more simplified types of identification (e.g., barcoded tag) may be more practical in other embodiments where a person's interaction with conferencing system 101 is minimal and may rely on preset contextual situations and action strategies, not associated with the specific person's own contextual activity. In some embodiments, a person can add their facial parameters to a user profile by having their face analyzed using a camera capturing a 360 degree picture of the person's head.

In embodiments, after creating a user profile 122, first person 408 can configure communication feed 406 by determining what is viewed and heard during the conference call by other participating parties. This can be done by adding and subtracting (i.e., modifying) audio feed 412, video feed 414, and display feed 415 from communication feed 406. In some embodiments, where conferencing system 101 provides mode switching (e.g., from a video call to an audio only call), modifying the communication feed may include adding/subtracting video only, adding/subtracting audio only, or a combination of both adding/subtracting audio and video.

Returning to FIG. 4, first environment 404 depicts what is captured by communication feed 406 before any modification has been made to either the audio feed 412 or video feed 414. Alternatively, modified first environment 410 depicts an exemplary embodiment of what can be observed by other parties participating in the conference call after communication feed 406 has been modified. In embodiments having more than two participating parties, first party 402 can choose to: i) provide the other contributing parties with the same modified communication feed 406, ii) can choose to provide the other contributing parties with differently modified communication feeds, or iii) can choose to provide some of the participating parties with an unmodified communication feed (i.e., like first environment 404), while providing other participating parties with some form of modified communication feed. Furthermore, in some embodiments, first party 402 can participate in a conference call and be the only party utilizing conferencing system 101 to modify communication feed 406. In this embodiment, the other parties will be able to view/receive the modified communication feed, but will not be able to use conferencing system 101 to modify their own communication feed.

In embodiments, first party 402 can decide to modify communication feed 406 by adding or subtracting particular environment components from first environment 404. In some embodiments, first person 408 can further configure their user profile, prior to initiating a conference call, to include a list of objects that first person 408 has identified to be unwanted environmental components, from first environment. By identifying the environmental components as unwanted environment components, first person 408 is deciding that those environment components should not appear in future conference meetings. An unwanted environment component can be one or more of any stationary or moving object or person, that first person 408 has determined to be actively removed from the video feed 414 (i.e., communication feed 406) of the conference call. In some embodiments, first person 408 can use a user interface to directly select the unwanted environment components to be modified. One possible method of modifying communication feed 406 to actively remove the unwanted environment component(s) can be to cover each unwanted environment component with a digital patch. A digital patch can include, but is not limited to, i) blurring out, or partially obscuring, the unwanted environment component, ii) identifying a wanted environment component and overlaying the unwanted environment component with an image/video of the wanted environment component, and iii) identifying the background components of an unwanted environment component and compiling an image/video of the proposed background to overlay over the unwanted environment component, essentially subtracting it from first environment 404.

While in some embodiments a wanted environment component can be selected from a digital library, in other embodiments a wanted environment component can be selected directly from first environment 404. A digital patch can be produced using any known method of producing layering in video feeds, such as video feed 414 (e.g., mixed reality, augmented reality or virtual reality, etc.). In many embodiments, a digital patch can be configured to move with the person or object to ensure each unwanted environment component is consistently removed from communication feed 406 for the duration of the conference call. In some embodiments, first person 408 can identify components worn by first person 408 to be modified. For example, if first person 408 is wearing casual clothes and the conference call is a meeting that requires professional attire, first person 408 can have his casual clothes visually replaced with a digital patch of a suit. In some embodiments, conferencing system 101 can be configured to allow first person 408 to choose one or more wanted environmental components to add to first environment 404. For example, first person 408 could add a cactus plant or a hang a picture of the Mona Lisa on a wall of first environment 404.

In embodiments, conferencing system 101 can be configured to perform facial recognition on every person in first environment 404, even those who are not part of first party 402. As shown in FIG. 4, first party 402 participating in a conference call has first person 408, while second person 420, third person 422, fourth person 424, and fifth person 426 are located as part of the background of first environment 404, but might not be considered as part of first party 402. In these embodiments, conferencing system 101 identifies facial parameters associated with each person, (i.e., second person 420, third person 422, fourth person 424, and fifth person 426) and compares those facial parameters to the facial parameters stored in the user profiles.

In embodiments where a person's identify is not recognized, conferencing system 101 can be configured to collect each person's facial recognition information (i.e., facial parameters) and maintain that information for future use. In some embodiments, first person can provide conferencing system 101 with facial recognition information with inputs, such as photo uploads, to act as static points in the learning/training process of conferencing system 101 prior to conference call. First person 408 can use this facial recognition information (referred to as a predefined user), whether received from the contextual activity of first environment or uploaded from a photo, to modify communication feed 406. For example, first person 408 can restrict or block (i.e., modify) a predefined user from the communication feed by identifying in the user profile preferences that the predefined user is an unwanted environment component. For instance, if first person 408 works from home and is often interrupted by family members entering first environment 404 during a conference call, first person 408 can identify family members as predefined users and classify them as unwanted environment components who should be actively removed from the communication feed each time they enter first environment 404. In some embodiments, if a person is identified whose facial recognition information does not correspond to some user profile preference, that person is not actively modified from the communication feed and the person remains visible during the conference call.

In embodiments, first person 408 can configure conferencing system 101 and user profile preferences to be an opt-in only system. Opt-in only systems typically aim to protect people's privacy rights by limiting the amount of personal information collected about them. In these opt-in only systems, conferencing system 101 can use facial recognition to determine whether the person has opted into the conference call by comparing the facial recognition information of the person to the facial recognition information provided in user profiles. If the facial recognition information matches a user profile, that person is automatically opted in. If the person's facial information does not match that of a user profile, the person must actively opt in by agreeing to special terms and conditions, such as an end user licensing agreement (EULA), in order to participate or contribute to the communication feed of the conference call. In some embodiments, a person who has not opted in can only opt in by being added to a user profile (e.g., second person 420 agrees to the EULA and is added to the user profile of first party 406 with first person 408) either prior to the conference call or during the conference call. For example, in a group conference call meeting, a person who has yet to opt in, can enter an environment (e.g., first environment 404) after a meeting has started and opt-in to the conference meeting and agree to possible terms and conditions using a login app on their phone. In other embodiments, a person can opt in by receiving permission from a person (e.g., first person 408) who has already opted in as part of a user profile or by performing a specific action or a key phrase to acknowledge the terms and conditions (e.g., password or finger snapping).

In embodiments, where facial recognition information (i.e., facial parameters) matches that of a user profile in conferencing system 101, that person can participate or collaborate to the conferencing call with first person 408 (i.e., can be part of first party 402). This can also be referred to as "opting in" to the conference meeting or conferencing system 101. When a person is recognized by conferencing system 101, they can be linked with their user profile and all relevant contextual activity, rules, contextual salutations, and action strategies associated with that person can be made available for conferencing system 101 during the conferencing call.

In these embodiments, conferencing system 101 can use facial recognition to differentiate between people to ensure, not only that people and objects are properly represented in modified communication feed 406, but to also ensure contextual activity is categorized with the correct person. In addition, while people who are in first location 404 may not be a participant of the conference call and have contextual situations and action strategies themselves, first person 408 (and participating party to the conference call) can have an action strategy associated with people walking in the background of first environment 404. For example, first person 408 could be participating in a conference call when a person walks into first environment 404. Using this example, conferencing system 101 could: i) identify the person as a person who is not a member of first party 402 or one recognized by an associated user profile, ii) determine that this person walking in the background is a contextual situation, and iii) trigger an action strategy (e.g., ask first user 408 to provide feedback to determine if this unrecognized person should be added to the user profile as a member of first party 402, or if the unrecognized person should be actively removed from the background of first environment 404 from the communication feed).

While facial recognition can be used in various embodiments of conferencing system 101 disclosed herein, voice recognition can be used as an alternative method of identifying people in the video or audio environment. In some embodiments, instead of relying on facial parameters, a user profile can rely on voice parameters of first party 408, and compare those voice parameters to additional voice audio detected in first environment 404 to determine if that person is part of the user profile or not. In many embodiments, where facial recognition is used, voice audio can be used as an alternative method of identifying a person.

In embodiments, first party 408 can modify communication feed 406 by adding or subtracting particular audible components from the audio feed 412 associated with the environment audio (i.e., audio input of first environment 404). Environment audio can include all audio received from audio devices and IoT feed sensors in first environment 404 that are not recognized voices belonging to a user profile of either first person 408 or another member of first party 402. In embodiments, conferencing system 101 can be configured to identify various sounds and differentiate between voices (e.g., MFCCs and Fast Fourier Transforms). While various methods exist, one such method of differentiating between sounds and/or voices can include utilizing the power bandwidth produced by each audible component.

Conferencing system 101 can be configured to maintain a repository of different audible components. This repository can be composed of audible components from the contextual activity (i.e., environment audio) and/or a pre-identified audible components (e.g., a list of commonly heard sounds and corresponding audio parameters). In some embodiments, prior to initiating a conference call, first person 408 can further configure conferencing system 101 to include a list of audible components from the environment audio and categorize those audible components as unwanted audible components. An unwanted audible component can be one or more of any noise, utterance, or voice that first person 408 has selected to be actively removed from the audio feed (i.e., communication feed) during a conference call. Unwanted audible components in conferencing system 101 can be identified using a variety of methods, including but not limited to: i) a person (e.g., first person 408) selecting an audible component from a live audio stream and specifically identifying it as an unwanted audible component, ii) a person (e.g., first person 408) selecting an audible component from a repository of contextual activity containing audio feed, iii) learning (i.e., using machine learning and statistical models) to classify audible components that have similar qualities (e.g., power bandwidth) to previously identified unwanted components, or iv) any combination thereof.

In embodiments, the unwanted audible components can be actively removed or reduced from audio feed 412 of communication feed 406 during a conference call in a variety of ways including, but not limited to, destructive interference, subtraction modulation, or any other known type of audio modulation that can remove or reduce unwanted audio components from audio feed 412. In some embodiments, first person 408 can identify all environmental audio to be an unwanted audible component. In some embodiments, first person 408 can further configure audio feed 412 by identifying one or more wanted audible components as part of user profile 122, to be added to communication feed 406 during the conference call. A wanted audible component can include any sound or noise first person 408 desires, such as birds singing or music playing in the background of the conference call.

The following example provides one illustration of how first person 408 can modify a communication feed during a conference call, and should not be considered the only way communication feed 406 could be modified. In FIG. 4, first environment 404 can include first object 416, second object 418, second person 420, third person 422, fourth person 424, and fifth person 426. Prior to the conference call, first person 408 can configure conferencing system 101 to identify first object 418, second object 420, third person 422, and fourth person 424 as unwanted environment components.

While in some embodiments first person 408 can identify what kind of digital patch should be used to cover the identified unwanted environment components, in other embodiments, conferencing system 101 can be configured to automatically determine and provide at least one digital patch option that is capable of covering the identified unwanted environment component in communication feed 406. Modified first environment 410 depicts all of the environment components of first environment 404 except those identified unwanted environment components that have effectively been removed by modifying communication feed 406.

Continuing with the above example, in modified first environment 410, first object 416 is visually covered by a digital patch that has been configured to mimic the background 428 of first object 416. As a result, the person or party viewing this modified communication feed would only be able to see what conferencing system 101 has determined to be background 428. Second object 418 can also be visually removed with the use of a viewable digital patch 430, possibly selected from a library of digital patches. Third and fourth persons, 422 and 424 respectively, have also been obscured visually from communication feed 406, possibly as predefined users. While third person and fourth person are still physically in the room, neither is visible in the modified communication feed.

As discussed above, conferencing system 101 can be configured to use facial recognition to identify people in first environment 404, but who are not associated as a participant with a user profile (i.e., not linked with first party 402 or first person 408) nor a participant in the conference call. This embodiment could be helpful in either the legal or medical profession where there is privileged information and a need for confidentiality during conference calls or meetings.

In addition to the above example, first person 404 can choose to further configure communication feed 406 by modifying the audio feed 412. As discussed herein, conferencing system 101 can be configured to identify different audible components or sounds from first environment 404 (e.g., comparing the power bandwidth). Conferencing system 101 can be configured to receive voice parameters (e.g., power bandwidth of person's voice), and perform voice recognition. In embodiments, when first person 408 creates a user profile 122 in conferencing system 101, the voice of first person 408 is analyzed to identify voice parameters capable of distinguishing first person's voice from other voice audio. These voice parameters are saved to a user profile (e.g., either first person 408 or first party 402). As discussed herein, conferencing system 101 can receive environment audio during a conference call. In some embodiments, conferencing system 101 can scan the environment audio to analyze different audible components and to analyze different contextual activity (e.g., for contextual situations and action strategies). In some situations, additional voice audio may be identified while conferencing system 101 is scanning the environment audio. When additional voice audio is identified, the additional voice audio can be analyzed for particular voice parameters. Once the voice parameters of the additional voice audio are determined, they can be compared to the voice parameters of the person(s) in the user profile (e.g., either first party 402 or first person 408). If the voice parameters do not match (i.e., no voice recognition), then their voice parameters can be added to the user profile as extra data for possible future contextual activity analysis. Collecting this voice recognition information does not automatically opt a person in to the first party.

In some embodiments, first person 408 can configure the user profile to identify all additional voice audio that is not associated with the user profile and remove it from the communication feed. This user profile configuration can be beneficial in situations where there are large groups of people around first person 408 during a conference call, whose additional voice audio could interfere with the voice audio of the first person. In some embodiments, first person 408 can adjust their power bandwidth to increase voice audibility.

While many embodiments require first person 408 to define the preferences in the user profile associated with a conference call, prior to the start of the conference call, in some embodiments first person 408 can further configure the user profile during the conference call or meeting. In embodiments, first person 408 can identify one or more second unwanted environment components and/or one or more second unwanted audible components during a conference call and modify the communication feed (i.e., video feed and/or audio feed) to remove those components as soon as they have been identified.

While first unwanted environment component and second unwanted environment component can be similar objects, first unwanted environment components can be identified prior to the conference call and second unwanted environment components can be identified during a conference call. Similarly, first unwanted audio components and second unwanted audio components can be similar audio components, first unwanted audio components can be identified prior to the conference call and second unwanted audio components can be identified during a conference call. For example, first person 408 may not be able to anticipate that a loud barking dog will run into first environment 404 during a conference call and as such, could not anticipate adding the dog as a first unwanted environment component or the loud barking as a first unwanted audible component. In some embodiments, conferencing system 101 can be configured to learn or identify (e.g., using machine learning models on contextual activity) possible unwanted components and can send a prompt to first user 408 asking if the loud barking dog should be subtracted or actively removed for the duration of the conference call.

In embodiments, conferencing system 101 can be configured to save all added and subtracted audio or video from communication feed 406 during a conference call. In these embodiments, the added or subtracted material can be saved to the user profile and/or on to a cloud database where it can be accessed at a later time.

Figure 5:
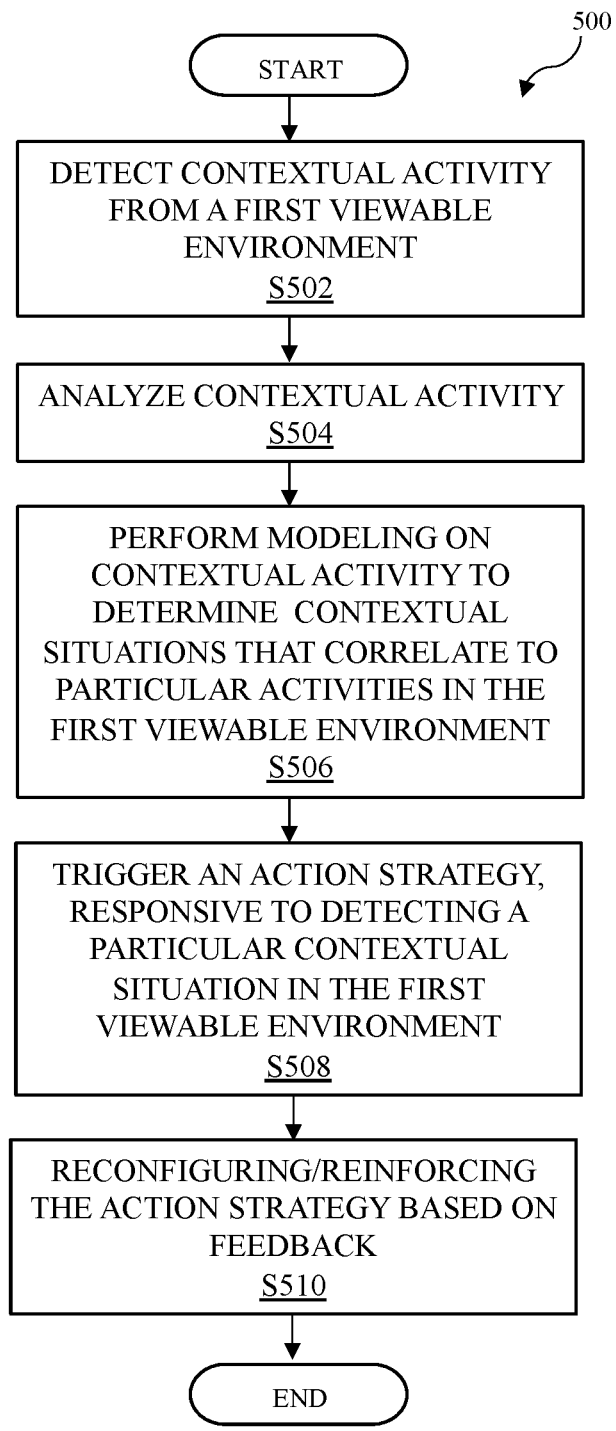
FIG. 5 is a flow chart diagram depicting operational steps by conferencing system 101, generally designated 500, for identifying and determining action strategies observed/detected in a conference call operation in accordance with at least one embodiment of the present invention.

FIG. 5 is a flow chart diagram depicting operational steps performed by conferencing system 101, generally designated 500, for identifying and triggering action strategies, in accordance with at least one embodiment of the present invention. These operational steps performed by conferencing system 101 allow for the triggering and performance of action strategies that are based on the observed contextual activity during a conference call. It should be appreciated that the steps as described in FIG. 5 allow conferencing system 101 to intuitively react to a party, based at least in part, on a party's conversation and actions during a conference call.

In some embodiments, method 500 begins at operational step S502, where conferencing system 101 detects contextual activity from a first environment. Contextual activity can be detected and captured by conferencing system 101, for example, using IoT sensor feeds. Contextual activity can refer to any background stimuli (e.g., a bright flash of light or sound), conversation, or activity performed by the participating party.

Method 500 proceeds to operational step S504, where the contextual activity detected by conferencing system 101 is analyzed using a variety of techniques as previous described with reference to FIGS. 1A-1B. These techniques can vary depending on the type of feed used to detect contextual activity (i.e., audio feed or video feed).

Method 500 proceeds to step S506. At step S506, conferencing system 101 performs modeling on the contextual activity to determine particular contextual situations that correlate to particular activities or events in the first environment. These particular activities or events can be referred to as action strategies. The modeling of contextual situations can be performed by using statistical modeling, deep learning, machine learning models, or any combination thereof.

Method 500 proceeds to step S508. At step S508, conferencing system 101 triggers a determined action strategy by detecting a particular contextual situation from the contextual activity observed/captured in the first environment.

Method 500 proceeds to step S510. At step S510, conferencing system 101 can be configured to reconfigure/reinforce the action strategy, based, at least in part, on feedback. In some embodiments, conferencing system 101 receives feedback associated with the effectiveness of an action strategy based on contextual activity detected that timely surrounds the performance of the action strategy. In other embodiments, conferencing system 101 requests and receives feedback from a participating party regarding the effectiveness of the action strategy. In some embodiments, after the feedback is received method 500 ends.

Figure 6:
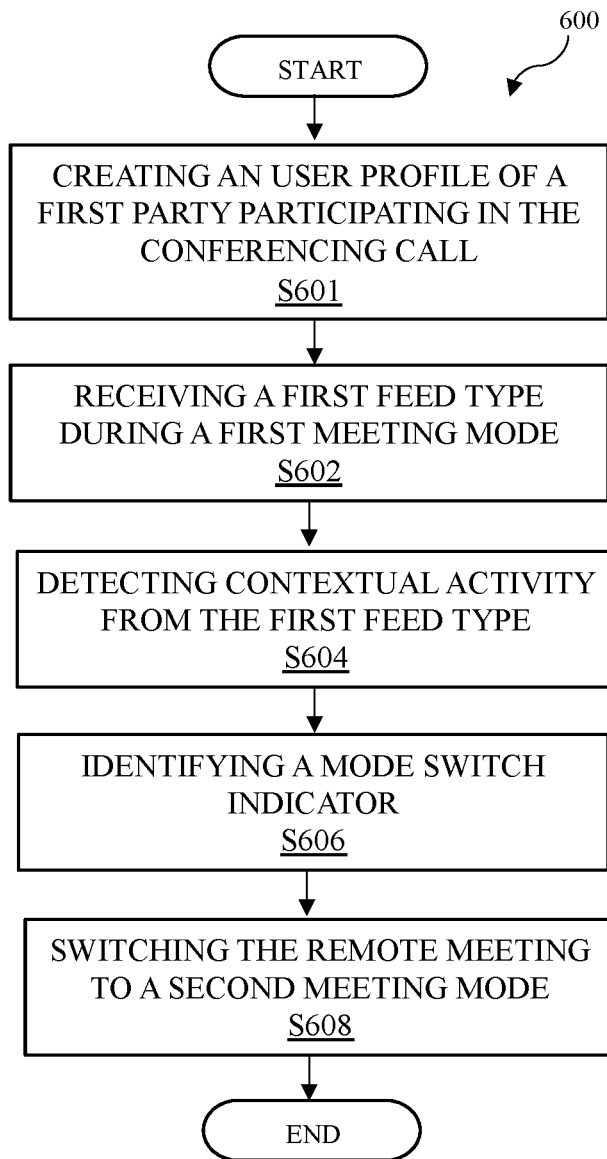
FIG. 6 is a flow chart diagram depicting operational steps by conferencing system 101, generally designated 600, for switching communication modes during a conference call in accordance with at least one embodiment of the present invention.

FIG. 6 is a flow chart diagram depicting operational steps performed by conferencing system 101, generally designated 600, for switching meeting modes from one communication mode to another communication mode based, at least in part, on an identified contextual activity, in accordance with at least one embodiment of the present invention. It should be appreciated that the steps as described in FIG. 6, allow conferencing system 101 to intuitively react to a party, based at least in part on a party's conversation and actions during a conference call.

In some embodiments, method 600 begins at operational step S601. At operational step S601, a user profile is created for a first party participating in a conference call in conferencing system 101. In some embodiments, a user profile is created for each participating party of a conference call, while in other embodiments a user profile is created for each person of a participating party.

The method 600 proceeds to step S602. At step S602, conferencing system 101 is configured to receive a first feed type during a first meeting mode during a conference call. A first feed type can include an audio feed, a video feed, a display feed, or any possible combination thereof.

The method 600 proceeds to step S604. At step S604, conferencing system 101 detects contextual activity from the first feed type. The type of contextual activity received from first feed type is dependent on the type of feed. For example, an audio feed will not be able to use viewable actions as a type of contextual activity.

The method 600 proceeds to step S606. At step S606, conferencing system 101 identifies a mode switch indicator from the contextual activity. In embodiments, mode switch indicator can be a particular contextual situation based, at least in part, on observed contextual activity during the conferencing call, that indicates a switch in the mode of communication during a conference call that should be made.

The method 600 proceeds to step S608. At S608, conferencing system 101, in response to identifying and observing the mode switch indicator during the conference call, switches the conference call from a first communication or meeting mode to a second communication or meeting mode. In some embodiments, after the communication or meeting mode has been switched, method 600 ends.

Figure 7:
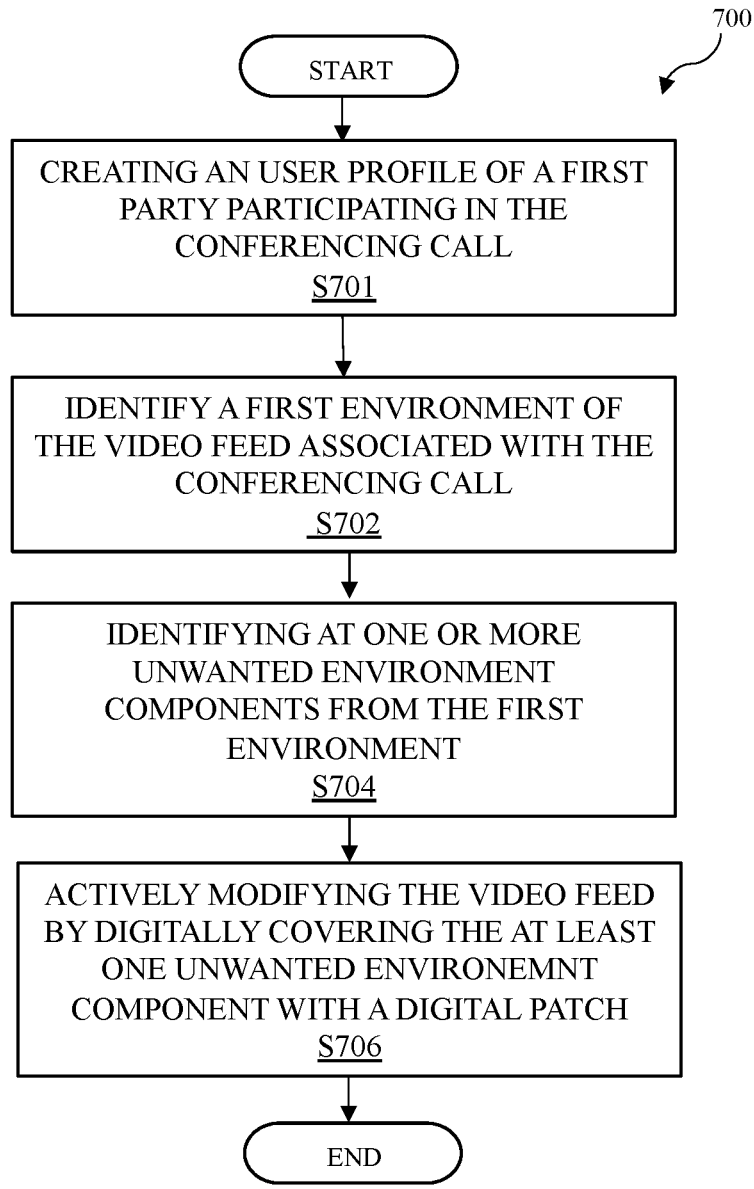
FIG. 7 is a flow chart diagram depicting operational steps by conferencing system 101, generally designated 700, for actively modifying a communication feed by removing one or more unwanted environment components during a conference call in accordance with at least one embodiment of the present invention.

FIG. 7 is a flow chart diagram depicting operational steps performed by conferencing system 101, generally designated 700, for actively modifying the video feed of a communication feed during a conference call in accordance with at least one embodiment of the present invention. It should be appreciated that the steps as described in FIG. 7 allow conferencing system 101 and participating parties to selectively choose the viewable environment associated with the conference call based, at least in part, on information included in a party's user profile.

In some embodiments, method 700 begins at operational step S701. At method step S701, conferencing system 101 creates a user profile of a first party participating in the conference call. In some embodiments, a user profile is created for each participating party of a conference call, while in other embodiments a user profile is created for each person of a participating party.

The method 700 proceeds to S702, where conferencing system 101 is configured to identify a first environment of the video feed associated with a participating party during a conference call (i.e. video call).

The method 700 proceeds to step S704. At step S704, conferencing system 101 identifies one or more unwanted environment components from the first environment. In embodiments, the one or more unwanted environment components of the first environment can be based, at least in part on, information included in a party's user profile.

The method 700 proceeds to step S706. At step S706, conferencing system 101 actively modifies the video feed (i.e., communication feed) by digitally covering the one or more unwanted environment components with a digital patch. In some embodiments, after the one or more unwanted environment components are removed method 700 ends.

Figure 8:
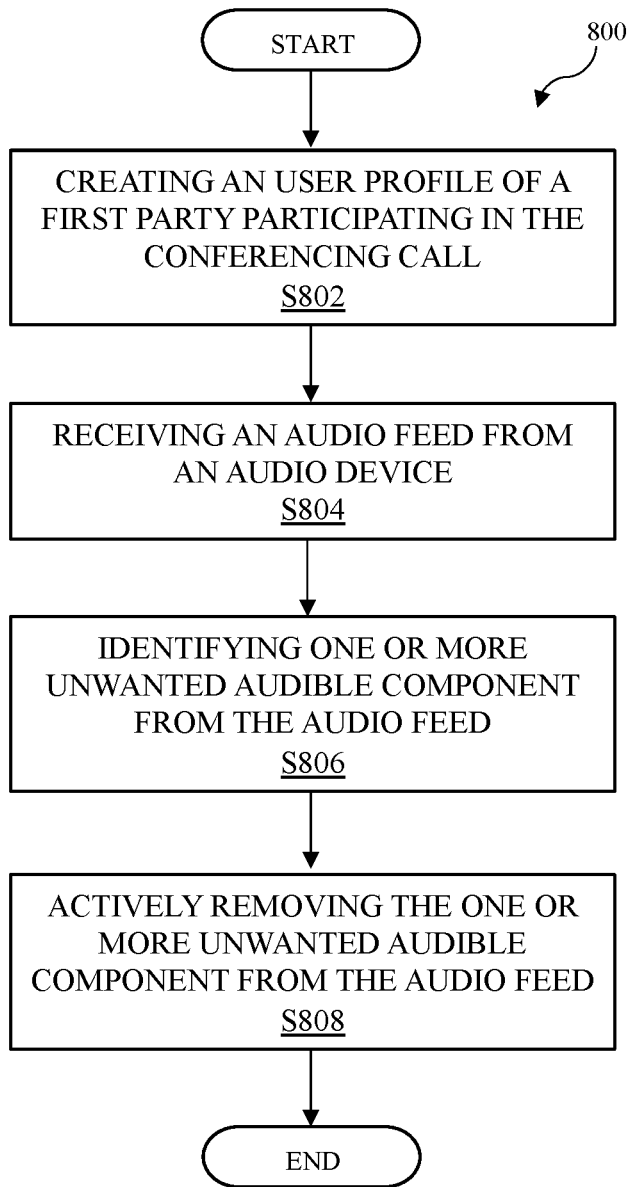
FIG. 8 is a flow chart diagram depicting operational steps by conferencing system 101, generally designated 800, for actively modifying a communication feed by removing one or more unwanted audible components during a conference call in accordance with at least one embodiment of the present invention.

FIG. 8 is a flow chart diagram depicting operational steps performed by conferencing system 101, generally designated 800, for actively modifying the audio feed of a communication feed during a conference call in accordance with at least one embodiment of the present invention. It should be appreciated that the steps as described in FIG. 8, allow conferencing system 101 and participating parties to selectively choose the audible environment associated with the conference call based, at least in part, on the information included in a party's user profile.

In some embodiments, method 800 begins at operational step S802, where conferencing system 101 is configured to create a user profile based, at least in part, on a participating party's preferences, during a conference call (i.e. audio call).

The method 800 proceeds to step S804. At step S804, where conferencing system 101 is configured to receive an audio feed from an audio device during a conference call (i.e. audio call).

The method 800 proceeds to step S806. At step S806, conferencing system 101 identifies one or more unwanted audible components from the audio feed. In embodiments, the one or more unwanted audible components of the audio feed can be based, at least in part on, the information included in a party's user profile.

The method 800 proceeds to step S808. At step S808, conferencing system 101 actively modifies the audio feed (i.e., communication feed) by removing the one or more unwanted audio components and/or replacing the one or more unwanted audio component with one or more wanted audio components of the audio feed. In some embodiments, after the one or more unwanted audible components are removed and/or replaced, method 800 ends.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9A:
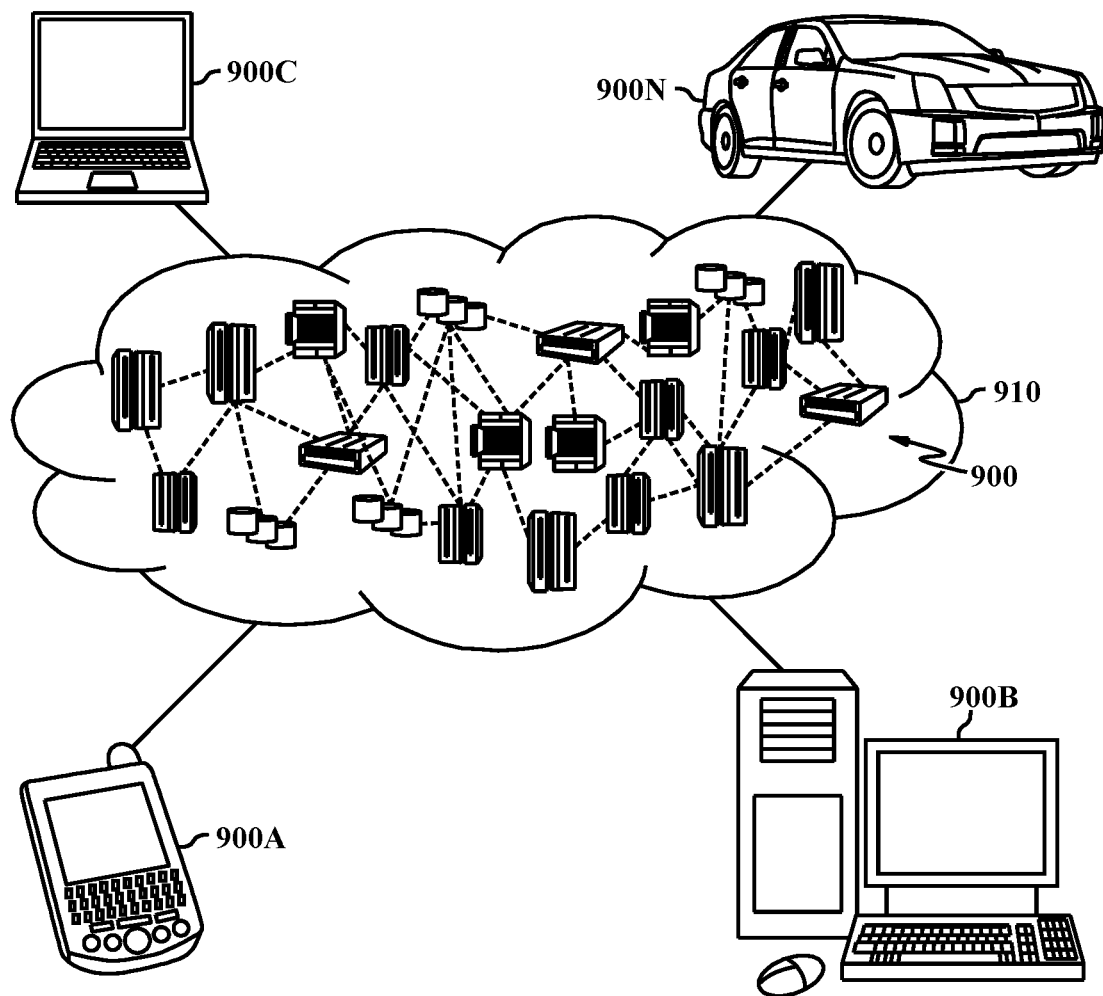
FIG. 9A illustrates a cloud computing environment, in accordance with embodiments of the present invention.

Referring now to FIG. 9A, illustrative cloud computing environment 910 is depicted. As shown, cloud computing environment 910 includes one or more cloud computing nodes 900 with which local computing devices used by cloud consumers, such as, for example, personal digital assistant (PDA) or cellular telephone 900A, desktop computer 900B, laptop computer 900C, and/or automobile computer system 900N may communicate. Nodes 900 may communicate with one another. They may be grouped (not shown) physically or virtually, in one or more networks, such as Private, Community, Public, or Hybrid clouds as described hereinabove, or a combination thereof. This allows cloud computing environment 910 to offer infrastructure, platforms and/or software as services for which a cloud consumer does not need to maintain resources on a local computing device. It is understood that the types of computing devices 900A-N shown in FIG. 9A are intended to be illustrative only and that computing nodes 900 and cloud computing 900 and cloud computing environment 910 can communicate with any type of computerized device over any type of network and/or network addressable connection (e.g., using a web browser).

Figure 9B:
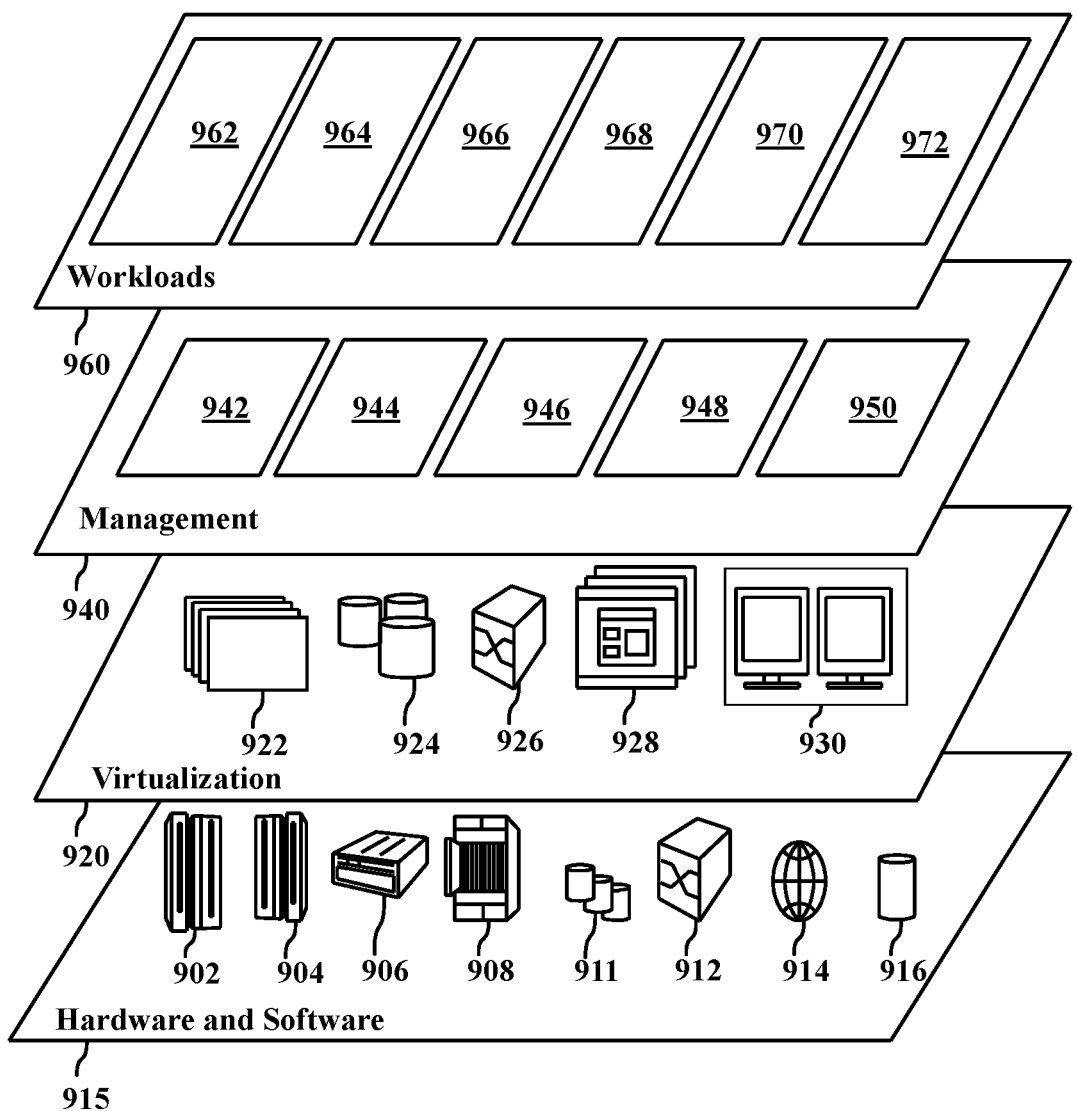
FIG. 9B illustrates abstraction model layers, in accordance with embodiments of the present invention.

Referring now to FIG. 9B, a set of functional abstraction layers provided by cloud computing environment 910 (FIG. 9A) is shown. It should be understood in advance that the components, layers, and functions shown in FIG. 9B are intended to be illustrative only and embodiments of the disclosure are not limited thereto. As depicted below, the following layers and corresponding functions are provided.

Hardware and software layer 915 includes hardware and software components. Examples of hardware components include: mainframes 902; RISC (Reduced Instruction Set Computer) architecture based servers 904; servers 906; blade servers 908; storage devices 911; and networks and networking components 912. In some embodiments, software components include network application server software 914 and database software 916.

Virtualization layer 920 provides an abstraction layer from which the following examples of virtual entities may be provided: virtual servers 922; virtual storage 924; virtual networks 926, including virtual private networks; virtual applications and operating systems 928; and virtual clients 930.

In one example, management layer 940 may provide the functions described below. Resource provisioning 942 provides dynamic procurement of computing resources and other resources that are utilized to perform tasks within the cloud computing environment. Metering and Pricing 944 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 946 provides access to the cloud computing environment for consumers and system administrators. Service level management 948 provides cloud computing resource allocation and management such that required service levels are met. Service Level Agreement (SLA) planning and fulfillment 950 provide pre-arrangement for, and procurement of, cloud computing resources for which a future requirement is anticipated in accordance with an SLA.

Workloads layer 960 provides examples of functionality for which the cloud computing environment may be utilized. Examples of workloads and functions which may be provided from this layer include: mapping and navigation 962; software development and lifecycle management 964; virtual classroom education delivery 966; data analytics processing 968; transaction processing 970; and communication feed modifying 972.

Figure 10:
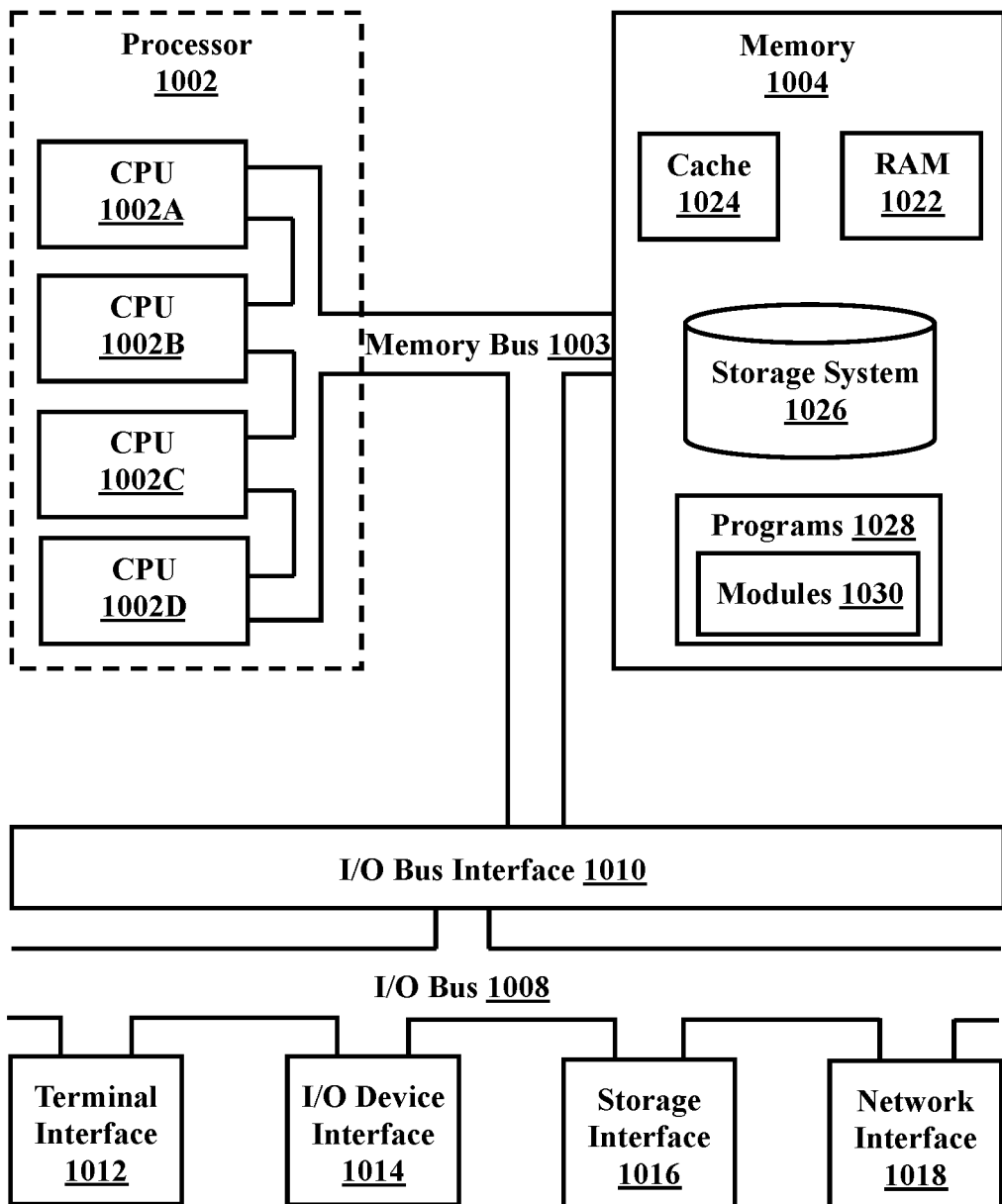
FIG. 10 illustrates a high-level block diagram of an example computer system 1001 that may be used in implementing one or more of the methods, tools, and modules, and any related functions, described herein, in accordance with embodiments of the present invention.

FIG. 10, illustrated is a high-level block diagram of an example computer system 1001 that may be used in implementing one or more of the methods, tools, and modules, and any related functions, described herein (e.g., using one or more processor circuits or computer processors of the computer), in accordance with embodiments of the present invention. In some embodiments, the major components of the computer system 1001 may comprise one or more Processor 1002, a memory subsystem 1004, a terminal interface 1012, a storage interface 1016, an I/O (Input/Output) device interface 1014, and a network interface 1018, all of which may be communicatively coupled, directly or indirectly, for inter-component communication via a memory bus 1003, an I/O bus 1008, and an I/O bus interface unit 1010.

The computer system 1001 may contain one or more general-purpose programmable central processing units (CPUs) 1002A, 1002B, 1002C, and 1002D, herein generically referred to as the CPU 1002. In some embodiments, the computer system 1001 may contain multiple processors typical of a relatively large system; however, in other embodiments the computer system 1001 may alternatively be a single CPU system. Each CPU 1002 may execute instructions stored in the memory subsystem 1004 and may include one or more levels of on-board cache.

System memory 1004 may include computer system readable media in the form of volatile memory, such as random access memory (RAM) 1022 or cache memory 1024. Computer system 1001 may further include other removable/non-removable, volatile/non-volatile computer system storage media. By way of example only, storage system 1026 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 1004 can include flash memory, e.g., a flash memory stick drive or a flash drive. Memory devices can be connected to memory bus 1003 by one or more data media interfaces. The memory 1004 may include at least one program product having a set (e.g., at least one) of program modules that are configured to carry out the functions of various embodiments.

One or more programs/utilities 1028, each having at least one set of program modules 1030 may be stored in memory 1004. The programs/utilities 1028 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 1028 and/or program modules 1030 generally perform the functions or methodologies of various embodiments.

Although the memory bus 1003 is shown in FIG. 10 as a single bus structure providing a direct communication path among the CPUs 1002, the memory subsystem 1004, and the I/O bus interface 1010, the memory bus 1003 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1010 and the I/O bus 1008 are shown as single respective units, the computer system 1001 may, in some embodiments, contain multiple I/O bus interface units 1010, multiple I/O buses 1008, or both. Further, while multiple I/O interface units are shown, which separate the I/O bus 1008 from various communications paths running to the various I/O devices, in other embodiments some or all of the I/O devices may be connected directly to one or more system I/O buses.

In some embodiments, the computer system 1001 may be a multi-user mainframe computer system, a single-user system, or a server computer or similar device that has little or no direct user interface, but receives requests from other computer systems (clients). Further, in some embodiments, the computer system 1001 may be implemented as a desktop computer, portable computer, laptop or notebook computer, tablet computer, pocket computer, telephone, smartphone, network switches or routers, or any other appropriate type of electronic device.

It is noted that FIG. 10 is intended to depict the representative major components of an exemplary computer system 1001. In some embodiments, however, individual components may have greater or lesser complexity than as represented in FIG. 10, components other than or in addition to those shown in FIG. 10 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method for switching the meeting mode of a communication feed during a conference call, comprising:
   receiving a first feed type from the communication feed during a first meeting mode;
   detecting a plurality of contextual activity from the communication feed of a first party;
   observing a first mode switch indicator from the plurality of contextual activity;
   responsive to observing the first mode switch indicator, switching the conference call from the first meeting mode to a second meeting mode, wherein the second meeting mode is associated with the particular contextual activity;
   observing a second mode switch indicator from the plurality of contextual activity; and
   responsive to observing the second mode switch indicator, switching the conference call from the second meeting mode to the first meeting mode.

2. The computer-implemented method of claim 1, wherein observing a first mode switch indicator from the plurality of contextual activity further comprises:
   processing the plurality of contextual activity from the first party;
   modeling the plurality of contextual activity to extract a first contextual situation; and
   determining if the first contextual situation is the first mode switch indicator.

3. The computer-implemented method of claim 1, further comprising:
   observing the first mode switch indicator from the communication feed; and
   determining a first action strategy by analyzing the plurality of contextual activity associated with the first mode switch indicator.

4. The computer-implemented method of claim 3, further comprising:
   receiving feedback associated with the first mode switch indicator; and
   reconfiguring the first mode switch indicator associated with the first action strategy based, at least in part, on the received feedback.

5. The computer-implemented method of claim 3, wherein the first action strategy includes a timer-based activity, wherein the timer-based activity is determined based, at least in part, on analyzing the plurality of contextual activity associated with the first mode switch indicator.

6. The computer-implemented method of claim 3, wherein the first action strategy includes at least one action selected from the group consisting of: switching the conference call from a first meeting mode to a second meeting mode for a predetermined time; turning the conference call on or off; and turning the conference call off and redialing the conference call after a predetermined period of time, wherein the predetermined period of time is determined based, at least in part, a learned time range associated with the first mode switch indicator.

7. The computer-implemented method of claim 3, further comprising:
   observing the first mode switch indicator during the conference call; and
   triggering the first action strategy associated with the first mode switch indicator.

8. The computer-implemented method of claim 7, further comprising:
   receiving feedback associated with the first action strategy; and
   reconfiguring the first action strategy to correlate with a user profile of the first party, based at least on the received feedback.

9. The computer-implemented method of claim 1, further comprising:
   determining the second mode switch indicator from the plurality of contextual activity of the communication feed.

10. The computer-implemented method of claim 1, further comprising:
    modeling the plurality of contextual activity;
    determining a second contextual situation based on modeling the plurality of contextual activity;
    modeling the plurality of contextual activity associated with the second contextual situation; and
    determining a second action strategy associated with observing the second contextual situation in the plurality of contextual activity of the communication feed.

11. The computer-implemented method of claim 10, wherein the second action strategy further includes actively modifying the communication feed during the conference call.

12. The computer-implemented method of claim 10, wherein the second action strategy further includes actively modifying an audio feed during the conference call.

13. The computer-implemented method of claim 10, wherein the second action strategy further includes actively modifying a video feed during the conference call.

14. The computer-implemented method of claim 1, wherein observing the first mode switch indicator from the plurality of contextual activity further includes processing a historical repository of contextual activity associated with the first party from past conference calls to identify historical patterns.

15. The computer-implemented method of claim 14, wherein processing the historical repository of the plurality of contextual activity to identify historical patterns is based, at least in part, on using a machine learning model to determine the first mode switch indicator.

16. The computer-implemented method of claim 1, wherein switching the conference call from the first meeting mode to the second meeting mode further comprises conducting the first meeting mode using a stationary device and switching the conference call to a mobile device during the second meeting mode.

17. A computer system for switching the meeting mode of a communication feed during a conference call, the computer system comprising:
   one or more computer processors;
   one or more computer readable storage media;
   computer program instructions;
   the computer program instructions being stored on the one or more computer readable storage media for execution by the one or more computer processors; and
   the computer program instructions including instructions to:
      receive a first feed type from the communication feed during a first meeting mode;
      detect a plurality of contextual activity from the communication feed of a first party;
      observe a first mode switch indicator from the plurality of contextual activity;
   switch the conference call from the first meeting mode to a second meeting mode, wherein the second meeting mode is associated with the particular contextual activity, responsive to observing the first mode switch indicator;
   observing the second mode switch indicator from the plurality of contextual activity; and
   responsive to observing the second mode switch indicator, switching the conference call from the second meeting mode to a third meeting mode.

18. A computer program product for switching the meeting mode of a communication feed during a conference call, the computer program product comprising one or more computer readable storage media and program instructions stored on the one or more computer readable storage media, the program instructions including instructions to:
   receive a first feed type from the communication feed during a first meeting mode;
   detect a plurality of contextual activity from the communication feed of a first party;
   observe a first mode switch indicator from the plurality of contextual activity;
   switch the conference call from the first meeting mode to a second meeting mode, wherein the second meeting mode is associated with the particular contextual activity, responsive to observing the first mode switch indicator;
   observing the second mode switch indicator from the plurality of contextual activity; and
   responsive to observing the second mode switch indicator, switching the conference call from the second meeting mode to the first meeting mode.

* * * * *